(12) United States Patent
Priestley et al.

(10) Patent No.: US 11,214,672 B2
(45) Date of Patent: Jan. 4, 2022

(54) HYBRID POLYMER-INORGANIC NANOCOLLOIDS AND METHODS OF MAKING THEM

(71) Applicant: The Trustees of Princeton University, Princeton, NJ (US)

(72) Inventors: Rodney D. Priestley, Princeton, NJ (US); Robert K. Prud'homme, Princeton, NJ (US); Victoria Lee, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 136 days.

(21) Appl. No.: 16/246,928

(22) Filed: Jan. 14, 2019

(65) Prior Publication Data

US 2019/0225787 A1    Jul. 25, 2019

Related U.S. Application Data

(60) Provisional application No. 62/619,396, filed on Jan. 19, 2018.

(51) Int. Cl.
*C08L 25/06*        (2006.01)
*C08L 47/00*        (2006.01)
(Continued)

(52) U.S. Cl.
CPC ............... *C08L 25/06* (2013.01); *B01J 23/40* (2013.01); *B01J 23/52* (2013.01); *B01J 23/70* (2013.01); *B01J 31/069* (2013.01); *B01J 31/28* (2013.01); *B01J 35/002* (2013.01); *B01J 35/0013* (2013.01); *B01J 35/023* (2013.01); *B01J 35/065* (2013.01); *B01J 37/04* (2013.01); *C08K 5/56* (2013.01); *C08L 25/18* (2013.01); *C08L 47/00* (2013.01); *C08L 71/02* (2013.01);
(Continued)

(58) Field of Classification Search
CPC ... B01J 13/00; B01J 13/22; B01J 23/00; B01J 37/0215; B01J 37/04; B01J 23/70; B01J 35/002; B01J 23/40; B01J 35/065; B01J 35/0013; B01J 35/023; B01J 31/28; B01J 31/069; B01J 23/52; B01J 2531/18; C08L 25/06; C08L 47/00; C08L 25/18; C08L 71/02; C08L 2201/56; C08K 5/56; B82Y 40/00; B82Y 30/00
See application file for complete search history.

(56) References Cited

U.S. PATENT DOCUMENTS 7,112,369 B2    9/2006 Wang et al.
7,348,365 B2    3/2008 Lee et al.
(Continued)

FOREIGN PATENT DOCUMENTS

EP        2558074 A1    2/2013
WO    2006014626 A2    2/2006
(Continued)

OTHER PUBLICATIONS

Tian, Langmuir 2010, 26(11), p. 8762-8768 (Year: 2010).*
(Continued)

*Primary Examiner* — Robert C Boyle
(74) *Attorney, Agent, or Firm* — Panitch Schwarze Belisario & Nadel LLP; Lars H. Genieser

(57) ABSTRACT

Hybrid polymer-inorganic nanocolloids and methods of making them are described.

20 Claims, 5 Drawing Sheets

(51) Int. Cl.
| | |
|---|---|
| C08L 25/18 | (2006.01) |
| C08K 5/56 | (2006.01) |
| B01J 35/00 | (2006.01) |
| B01J 35/02 | (2006.01) |
| B01J 31/28 | (2006.01) |
| B01J 31/06 | (2006.01) |
| C08L 71/02 | (2006.01) |
| B01J 23/52 | (2006.01) |
| B01J 37/04 | (2006.01) |
| B01J 23/70 | (2006.01) |
| B01J 23/40 | (2006.01) |
| B01J 35/06 | (2006.01) |
| B82Y 40/00 | (2011.01) |
| B82Y 30/00 | (2011.01) |

(52) U.S. Cl.
CPC .............. B82Y 30/00 (2013.01); B82Y 40/00 (2013.01); C08L 2201/56 (2013.01)

(56) References Cited

U.S. PATENT DOCUMENTS

| | | | |
|---|---|---|---|
| 8,137,699 | B2 | 3/2012 | Johnson et al. |
| 8,288,001 | B1 | 10/2012 | Fan et al. |
| 2003/0013799 | A1 | 1/2003 | Crooks et al. |
| 2007/0231355 | A1 | 10/2007 | Quadir et al. |
| 2008/0260851 | A1 | 10/2008 | Somasundaran et al. |
| 2010/0305219 | A1 | 12/2010 | Granick et al. |
| 2010/0330368 | A1 | 12/2010 | Prud'homme et al. |
| 2011/0022129 | A1 | 1/2011 | Prud'homme et al. |
| 2011/0213066 | A1 | 9/2011 | Wang et al. |
| 2011/0268803 | A1 | 11/2011 | Prud'homme et al. |
| 2012/0041150 | A1* | 2/2012 | Yabu .................. B22F 9/24 525/280 |
| 2012/0052097 | A1 | 3/2012 | Fetzer et al. |
| 2012/0132346 | A1 | 5/2012 | Chen et al. |
| 2012/0171254 | A1 | 7/2012 | Johnson et al. |
| 2012/0308640 | A1 | 12/2012 | Percec et al. |
| 2013/0037977 | A1 | 2/2013 | Burke et al. |
| 2013/0171208 | A1 | 7/2013 | Smith et al. |
| 2013/0336915 | A1 | 12/2013 | Mayer et al. |
| 2015/0299369 | A1 | 10/2015 | Ausserre et al. |

FOREIGN PATENT DOCUMENTS

| | | | |
|---|---|---|---|
| WO | 2008074702 | A1 | 6/2008 |
| WO | 2009061406 | A1 | 5/2009 |
| WO | 2011127255 | A1 | 10/2011 |
| WO | 2013023003 | A1 | 2/2013 |
| WO | 2013053598 | A1 | 4/2013 |
| WO | 2013063279 | A1 | 5/2013 |
| WO | 2015130835 | A1 | 9/2015 |
| WO | WO-2015130835 | A1 * | 9/2015 .............. A61K 9/107 |
| WO | 2015200054 | A2 | 12/2015 |
| WO | 2018067469 | A1 | 4/2018 |

OTHER PUBLICATIONS

Sosa, Macromolecules, 2016, 49, p. 3580-3585 (Year: 2016).*
Akbulut M. et al., Generic Method of Preparing Multifunctional Fluorescent Nanoparticles Using Flash NanoPrecipitation, Adv. Funct. Mater., 19, 718-725 (2009).
Anker, J. N. & Kopelman, R. Magnetically modulated optical nanoprobes. Applied Physics Letters 82(7), 1102-1104, doi: 10.1063/1.1544435 (2003).
Ansell, S.M. et al., Modulating the therapeutic activity of nanoparticle delivered paclitaxel by manipulating the hydrophobicity of prodrug conjugates, J. Med. Chem., 51 (11), 3288-3296 (Jun. 2008).
Arita, T. et al. Localization of polymer-grafted maghemite nanoparticles in a hemisphere of Janus polymer particles prepared by a self-organized precipitation (SORP) method. J. Mater. Chem. C 1, 207-212 (2013).
Binks, B. P. & Fletcher, P. D. I. Particles Adsorbed at the Oil-Water Interface: A Theoretical Comparison between Spheres of Uniform Wettability and "Janus" Particles. Langmuir: The ACS Journal of Surfaces and Colloids 17, 4708-4710 (2001).
Budijono, S.J. et al., Block Copolymer Surface Coverage on Nanoparticles, Colloids and Surfaces A—Physicochemical and Engineering Aspects, 360, 105-110 (2010).
Budijono, S.J. et al., Synthesis of Stable Block-Copolymer-Protected NaYF4:Yb3+, Er3+ Up-Converting Phosphor Nanoparticles, Chem. Mat., 22(2), 311-318 (2010).
Chen, Q., Bae, S. C. & Granick, S. Directed self-assembly of a colloidal kagome lattice. Nature 469, 381-384, doi: 10.1038/nature09713 (2011) (4 pages & 1 page Methods).
Crossley, S. et al., Solid Nanoparticles that Catalyze Biofuel Upgrade Reactions at the Water/Oil Interface, Science 327, 68-72 (2010) (5 pages & 1 page Abstract).
D'Addio, S.M. et al., Constant size, variable density aerosol particles by ultrasonic spray freeze drying, Int'l J. Pharmaceutics, 427(2), 185-191 (May 2012).
D'Addio, S.M. & Prud'homme, R.K., Controlling drug nanoparticle formation by rapid precipitation, Adv. Drug Delivery Rev., 63(6), 417-426 (May 2011).
D'Addio, S.M. et al., Effects of block copolymer properties on nanocarrier protection from in vivo clearance, J. Controlled Release, 162(1), 208-217 (Aug. 2012) (23 pages).
D'Addio, S.M. et al., Novel Method for Concentrating and Drying Polymeric Nanoparticles: Hydrogen Bonding Coacervate Precipitation, Molecular Pharmaceutics, 7(2), 557-564 (Mar.-Apr. 2010).
D'Addio, S.M. et al., Optimization of cell receptor-specific targeting through multivalent surface decoration of polymeric nanocarriers, J. Controlled Release, 168(1), 41-49 (May 2013) (21 pages).
Faria, J., Ruiz, M. P. & Resasco, D. E. Phase-Selective Catalysis in Emulsions Stabilized by Janus Silica-Nanoparticles Advanced Synthesis & Catalysis 352, 2359-2364 (2010).
Figueroa, C.E. et al., Effervescent redispersion of lyophilized polymeric nanoparticles, Therapeutic Delivery, 4(2), 177-190 (2013) (57 pages).
Figueroa, C.E. et al., Highly loaded nanoparticulate formulation of progesterone for emergency traumatic brain injury treatment, Therapeutic Delivery, 3(11), 1269-1279 (2012).
Frens, G., Controlled Nucleation for the Regulation of the Particle Size in Monodisperse Gold Suspensions. Nature Physical Science 241, 20-22 (1973).
Gao, W. et al., Organized self-assembly of Janus micromotors with hydrophobic hemispheres, Journal of the American Chemical Society, 135, 998-1001, doi:10.1021/ja311455k (2013).
Gindy, M.E. et al., Composite block copolymer stabilized nanoparticles: Simultaneous encapsulation of organic actives and inorganic nanostructures, Langmuir, 24(1), 83-90 (2008).
Gindy, M.E. et al., Preparation of Poly(ethylene glycol) Protected Nanoparticles with Variable Bioconjugate Ligand Density, Biomacromolecules, 9(10), 2705-2711 (2008).
Gröschel, A.H. et al., Guided hierarchical co-assembly of soft patchy nanoparticles, Nature, 503, 247-251 (5 pages & 11 pages Methods, Extended Data Figures 1-9, & Extended Data Table 1) (2013).
Han, J. et al., A simple confined impingement jets mixer for flash nanoprecipitation, Journal of Pharmaceutical Sciences, 101(10), 4018-4023 (2012).
Higuchi, T. et al., Spontaneous formation of polymer nanoparticles with inner micro-phase separation structures, Soft Matter, 4, 1302-1305, doi: 10.1039/b800904j (2008).
Jang, S. G. et al. Synthesis of thermally stable Au-core/Pt-shell nanoparticles and their segregation behavior in diblock copolymer mixtures, Soft Matter 7, 6255-6263, doi: 10.1039/clsm05223c (2011).
Jang, S. G. et al., Striped, ellipsoidal particles by controlled assembly of diblock copolymers, Journal of the American Chemical Society, 135, 6649-6657, doi: 10.1021/ja4019447 (2013).
Jeon, S.-J., Yi, G.-R. & Yang, S.-M., Cooperative Assembly of Block Copolymers with Deformable Interfaces: Toward Nanostructured Particles, Advanced Materials, 20, 4103-4108, doi: 10.1002/adma.200801377 (2008).

(56) References Cited

OTHER PUBLICATIONS

Jiang, S. et al., Janus particle synthesis and assembly, Adv. Mater., 22, 1060-1071, doi: 10.1002/adma.200904094 (2010).
Johnson B.K. & Prud'homme, R.K., Engineering the direct precipitation of stabilized organic and block copolymer nanoparticles as unique composites, Abstracts of Papers of the American Chemical Society, 226, U527 (#441) (Sep. 2003).
Johnson B.K. & Prud'homme, R.K., Mechanism for rapid self-assembly of block copolymer nanoparticles, Phys. Rev. Lett., 91(11) 118302-1-118302-4 (Sep. 12, 2003).
Johnson, B. K. & Prud'homme, R.K., Chemical Processing and Micromixing in Confined Impinging Jets, AIChE Journal, 49(9), 2264-2282 (Sep. 2003).
Johnson, B. K. & Prud'homme, R.K., Flash NanoPrecipitation of Organic Actives and Block Copolymers using a Confined Impinging Jets Mixer, Australian Journal of Chemistry, 56(10), 1021-1024 (2003).
Johnson, B.K. & Prud'homme, R.K. et al., Nanoprecipitation of organic actives using mixing and block copolymer stabilization, Abstracts of Papers of the American Chemical Society, 226, U487 (#186) (Sep. 2003).
Johnson, B.K., Saad, W. & Prud'homme, R.K., Nanoprecipitation of pharmaceuticals using mixing and block copolymer stabilization, (Chapter 18) Polymeric Drug Delivery II: Polymeric Matrices and Drug Particle Engineering, 924, 278-291 (2006).
Kanahara, M. et al., Fabrication of NIR-Excitable SERS-Active Composite Particles Composed of Densely Packed Au Nanoparticles on Polymer Microparticles, Particle & Particle Systems Characterization, 32, 441-447 (2015).
Kim, B.J. et al., Nanoparticle Surfactants as a Route to Bicontinuous Block Copolymer Morphologies, Langmuir: The ACS Journal of Surfaces and Colloids, 23, 7804-7809 (2007).
Kirillova, A. et al., Hybrid Hairy Janus Particles Decorated with Metallic Nanoparticles for Catalytic Applications. ACS Applied Materials & Interfaces, 7, 21218-21225 (2015).
Kumar, V. et al., Stabilization of the Nitric Oxide (NO) Prodrugs and Anticancer Leads, PABA/No. and Double JS-K, through Incorporation into PEG-Protected Nanoparticles, Molecular Pharmaceutics, 7(1), 291-298 (2010).
Kumar, V., Adamson, D.H., & Prud'homme, R.K., Fluorescent Polymeric Nanoparticles: Aggregation and Phase Behavior of Pyrene and Amphotericin B Molecules in Nanoparticle Cores, Small, 6(24), 2907-2914 (2010).
Ma, X., Hahn, K. & Sanchez, S., Catalytic mesoporous Janus nanomotors for active cargo delivery, Journal of the American Chemical Society, 137, 4976-4979, doi: 10.1021/jacs.5b02700 (2015).
Mayya, K. S. & Caruso, F., Phase Transfer of Surface-Modified Gold Nanoparticles by Hydrophobization with Alkylamines, Langmuir: The ACS Journal of Surfaces and Colloids, 19, 6987-6993 (2003).
Park, B. J., Brugarolas, T. & Lee, D., Janus particles at an oil-water interface, Soft Matter, 7, 6413-6417 (2011).
Pera-Titus, M. et al., Pickering interfacial catalysis for biphasic systems: from emulsion design to green reactions, Angew. Chem. Int. Ed., 54, 2006-2021 (2015).
Pinkerton, N.M. et al., Formation of Stable Nanocarriers by in Situ Ion Pairing during Block-Copolymer-Directed Rapid Precipitation, Mol. Pharmaceutics, 10, 319-328 (2013).
Pinkerton, N.M. et al., Gelation Chemistries for the Encapsulation of Nanoparticles in Composite Gel Microparticles for Lung Imaging and Drug Delivery, Biomacromolecules, 15(1), 252-261 (2014) (23 pages) DOI: 10.1021/bm4015232.
Pustulka, K.M. et al., Flash Nanoprecipitation: Particle Structure and Stability, Mol. Pharmaceutics, 10, 4367-4377 (2013).
Rahmani, S. & Lahann, J., Recent progress with multicompartmental nanoparticles, MRS Bulletin 39, 251-257, doi: 10.1557/mrs.2014.10 (2014).
Roh, K. H., Martin, D. C. & Lahann, J., Biphasic Janus particles with nanoscale anisotropy, Nature Materials, 4, 759-763, doi:10.1038/nmatl486 (2005).
Saad, W. S. & Prud'homme, R. K., Principles of nanoparticle formation by Flash Nanoprecipitation, Nano Today 11, 212-227 (2016) doi: 10.1016/j.nantod.2016.04.006 (16 pages).
Shan, J. et al., Pegylated Composite Nanoparticles Containing Upconverting Phosphors and meso-Tetraphenyl porphine (TPP) for Photodynamic Therapy, Adv. Functional Materials, 21(13), 2488-2495 (2011).
Shen, H. et al., Self-assembling process of flash nanoprecipitation in a multi-inlet vortex mixer to produce drug-loaded polymeric nanoparticles, J. Nanoparticle Res., 13(9), 4109-4120 (2011).
Sosa, C. et al., Soft Multifaced and Patchy Colloids by Constrained Volume Self-Assembly, Macromolecules, 49, 3580-3585 (2016).
Suzuki, D. & Kawaguchi, H., Janus particles with a functional gold surface for control of surface plasmon resonance, Colloid and Polymer Science, 284, 1471-1476 (2006).
Takei, H. & Shimizu, N., Gradient Sensitive Microscopic Probes Prepared by Gold Evaporation and Chemisorption on Latex Spheres, Langmuir: The ACS Journal of Surfaces and Colloids, 13(7), 1865-1868 (1997).
Tu, F. & Lee, D., Shape-changing and amphiphilicity-reversing Janus particles with pH-responsive surfactant properties. Journal of the American Chemical Society, 136, 9999-10006 (2014).
Turkevich, J., Stevenson, P. C. & Hillier, J., A Study of the Nucleation and Growth Processes in the Synthesis of Colloidal Gold, Discuss. Faraday Soc., 11, 55-75 (1951).
Walther, A, et al., Janus Discs, Journal of the American Chemical Society, 129, 6187-6198 (2007).
Yang, H. et al., Engineering the Shape of Block Copolymer Particles by Surface-Modulated Graphene Quantum Dots, Chem. Mater., 28, 830-837, doi: 10.1021/acs.chemmater.5b04222 (2016).
Yoon, K. et al.. Asymmetric functionalization of colloidal dimer particles with gold nanoparticles, Chem. Commun., 48, 9056-9058 (2012).
Zhang, C. et al., Flash nanoprecipitation of polystyrene nanoparticles, Soft Matter, 8(1), 86-93 (2012).
Zhang, S. et al., Photocrosslinking the polystyrene core of block copolymer nanoparticles, Polym. Chem., 2(3), 665-671 (2011).
Zhang, S., Prud'homme, R.K., & Link, J.A., Block Copolymer Nanoparticles as Nanobeads for the Polymerase Chain Reaction, Nano Lett., 11(4), 1723-1726 (2011).
Wong, J.E. et al., "Dual-stimuli responsive PNiPAM microgel achieved via layer-by-layer assembly: Magnetic and thermoresponsive", J. Colloid Interface Sci., vol. 324, pp. 47-54 (2008).
Wunder, S. et al., "Kinetic Analysis of Catalytic Reduction of 4-Nitrophenol by Metallic Nanoparticles Immobilized in Spherical Polyelectrolyte Brushes", J. Phys. Chem. C, vol. 114, pp. 8814-8820 (2010).
Xu, P. et al., "Multifunctional polymer-metal nanocomposites via direct chemical reduction by conjugated polymers", Chem. Soc. Rev., vol. 43, pp. 1349-1360 (2014).
Yamashita, N. et al., "Preparation of hemispherical particles by cleavage of micrometer-sized, spherical poly(methyl methacrylate)/polystyrene composite particle with Janus structure: effect of molecular weight," Colloid Polym. Sci., vol. 292, pp. 733-738 (2014).
Yoon, J. et al., "Amphiphilic Colloidal Surfactants Based on Electrohydrodynamic Co-jetting", ACS Appl. Mater. Interfaces, vol. 5, pp. 11281-11287 (2013).
Aizawa, M. et al., "Block copolymer template chemistry for the formation of metallic nanoparticle arrays on semiconductor surfaces", Chem. Mater., vol. 19, pp. 5090-5101 (2007).
Aizawa, M. et al., "Block Copolymer-Templated Chemistry on Si, Ge, InP, and GaAs Surfaces", J. American Chemical Society, vol. 127, pp. 8932-8933 (2005).
Anderson, R.M. et al., "An Experimental and Theoretical Investigation of the Inversion of Pd@Pt Core@Shell Dendrimer-Encapsulated Nanoparticles", ACS Nano, 7(10), pp. 9345-9353 (2013).
Antonietti, M. et al., "Synthesis and Characterization of Noble Metal Colloids in Block Copolymer Micelles", Advanced Materials, vol. 7, pp. 1000-1005 (1995).
Arnall, P. et al., "High-Temperature-Stable Catalysts by Hollow Sphere Encapsulation", Angew. Chem. Int. Ed., vol. 45, pp. 8224-8227 (2006).

(56) References Cited

OTHER PUBLICATIONS

Arshady, R., "Preparation of biodegradable microspheres and microcapsules: 2. Polyactides and related polyesters", J. Controlled Release, vol. 17, pp. 1-22 (1991).
Astruc, D. et al., "Nanoparticles as Recyclable Catalysts: The Frontier between Homogeneous and Heterogeneous Catalysis", Angew. Chem. Int. Ed., vol. 44, pp. 7852-7872 (2005).
Bae, J. et al., "Multifunctional Nanoparticle-Loaded Spherical and Wormlike Micelles Formed by Interfacial Instabilities", Adv. Mater., vol. 24, pp. 2735-2741 (2012).
Balluffi, R.W. et al., Kinetics of Materials, Wiley, 2005 (cover, bibliographical page, table of contents, and pp. xvii-xxvi, including Preface), 26 pages.
Bates, F.S., "Polymer-Polymer Phase Behavior," Science, vol. 251, pp. 898-905 (1991).
Beattie, J.K. et al.,"The surface of neat water is basic", Faraday Discuss., vol. 141, pp. 31-39 (2009).
Beckingham, B. et al., "Regular Mixing Thermodynamics of Hydrogenated Styrene-Isoprene Block-Random Copolymers", Macromolecules, vol. 46, pp. 3084-3091 (2013).
Bronich, T.K. et al., "Soluble Complexes from Poly(ethylene oxide)-block-polymethacrylate Anions and N-Alkylpyridinium Cations", Macromolecules, vol. 30, pp. 3519-3525 (1997).
Burda, C. et al., "Chemistry and Properties of Nanocrystals of Different Shapes", Chem. Rev., vol. 105, pp. 1025-1102 (2005).
Chang, E.P. et al., "Membrane Emulsification and Solvent Pervaporation Processes for the Continuous Synthesis of Functional Magnetic and Janus Nanobeads", Langmuir, vol. 28, pp. 9748-9758 (2012).
Chen, H. et al., "Encapsulation of Single Small Gold Nanoparticles by Diblock Copolymers", Chem. Phys. Chem. vol. 9, pp. 388-392 (2008).
Chung, J.W., "Investigation of coumarin functionality on the formation of polymeric nanoparticles", J. Colloid & Interface Science, vol. 396, pp. 16-22 (2013).
Cogswell, D.A. et al., "Coherency Strain and the Kinetics of Phase Separation in LiFePO4 Nanoparticles", ACS Nano, vol. 6, pp. 2215-2225 (2012).
Cogswell, D.A. et al., "Theory of Coherent Nucleation in Phase-Separating Nanoparticles", Nano Letters, vol. 13, No. 7, pp. 3036-3041 (2013), 7 pages.
Comotti, M. et al., "The Catalytic Activity of 'Naked' Gold Particles", Angew. Chem., vol. 116, pp. 5936-5939 (2004).
Eitouni, H.B. et al., "Chapter 19: Thermodynamics of Polymer Blends", Physical Properties of Polymers Handbook, J. E. Mark, ed., Springer, pp. 339-356 (2007).
Erhardt, R. et al., "Amphiphilic Janus micelles with polystyrene and poly(methacrylic acid) hemispheres", J. Am. Chem. Soc , vol. 125, No. 11, pp. 3260-3267 (Feb. 2003).
Foerster et al., "Amphiphilic block copolymers in structure-controlled nanomaterials hybrids", Adv. Mater. vol. 10, No. 3, pp. 195-217 (1998).
Ganesan, V. et al., "Mean-field models of structure and dispersion of polymer-nanoparticle mixtures", Soft Matter, vol. 6, pp. 4010-4025 (2010).
Gangwal, S. et al., "Dielectrophoretic Assembly of Metal-lodielectric Janus Particles in AC Electric Fields", Langmuir, vol. 24, pp. 13312-13320 (2008).
Gangwal, S. et al., "Induced-Charge Electrophoresis of Metal-lodielectric Particles", Phys. Rev. Lett., vol. 100, 058302-1-058302-4 (2008).
Gao, Y. et al., "How Half-Coated Janus Particles Enter Cells", J. Am. Chem. Soc., vol. 135, pp. 19091-19094 (2013).
Glaser, N. et al., "Janus Particles at Liquid-Liquid Interfaces", Langmuir, vol. 22, pp. 5227-5229 (2006).
Greene, A.C. et al., "Poly(acrylic acid-b-styrene) amphiphilic multiblock copolymers as building blocks for the aassembly of discrete nanoparticles", Macromolecules, vol. 44, pp. 1942-1951 (2011).
Grzelczak, M. et al., "Directed Self-Assembly of Nanoparticles", ACS Nano, vol. 4, No. 7, pp. 3591-3605 (2010).
Han, H. et al., "Synthesis of Poly(styrene-co-4-vinylpyridine) Microspheres via Dispersion Polymerization: Effect of the Concentration of 4-Vinylpyridine", Journal of Applied Polymer Science, vol. 111, pp. 2900-2907 (2009).
Hickey, R.J. et al., "Controlling the Self-Assembly Structure of Magnetic Nanoparticles and Amphiphilic Block-Copolymers: From Micelles to Vesicles", J. Am. Chem. Soc., vol. 133, pp. 1517-1525 (2011).
Holland, S.J. et al., "Polymers for biodegradable medical devices. 1. The potential of polyesters as controlled macromolecular release systems", J. Controlled Release, vol. 4, pp. 155-180 (1986).
Hussain, I. et al., "Size-Controlled Synthesis of Near-Monodisperse Gold Nanoparticles in the 1-4 nm Range Using Polymeric Stabilizers", J. Am. Chem. Soc., vol. 127, pp. 16398-16399 (2005).
Illum, L. et al., "Polymers in Controlled Drug Delivery", Wright, Bristol, 1987 (Preface, Contributors, Table of Contents), 3 pages.
International Search Report & Written Opinion for International Application PCT/US2015/017590 dated Jul. 16, 2015.
International Search Report & Written Opinion for International Application PCT/US2017/054779 dated Jan. 26, 2018.
Jana, N.R. et al., "Seeding Growth for Size Control of 5-40 nm Diameter Gold Nanoparticles", Langmuir, vol. 17, pp. 3782-6786 (2001).
Jang, S.G. et al., "Bicontinuous block copolymer morphologies produced by interfacially active, thermally stable nanoparticles". Macromolecules, vol. 44, No. 23, pp. 9366-9373 (2011).
Kadem, L.F. et al., "Controlled Self-Assembly of Hexagonal Nanoparticle Patterns on Nanotopographies", Langmuir, vol. 31, pp. 9261-9265 (2015).
Kang, Y. et al., "Core/Shell Gold Nanoparticles by Self-Assembly and Crosslinking of Micellar, Block-Copolymer Shells", Angew. Chem. Int. Ed., vol. 44, pp. 409-412 (2005).
Kim, B.-S. et al., "Magnetomicelles: Composite Nanostructures from Magnetic Nanoparticles and Cross-Linked Amphiphilic Block Copolymers", Nano Letters, vol. 5, No. 10, pp. 1987-1991 (2005).
Kiyono, Y. et al., "Preparation and Structural Investigation of PMMA-Polystyrene 'Janus Beads' by Rapid Evaporation of an Ethyl Acetate Aqueous Emulsion." e-Journal Surf. Sci. Nanotechnol., vol. 10, pp. 360-366 (2012).
Krack, M. et al., "Nanoparticle-Loaded Magnetophoretic Vesicles," J. Am. Chem. Soc., vol. 130, pp. 7315-7320 (2008).
Lavasanifar, A. et al., "Poly(ethylene oxide)-block-poly(L-amino acid) micelles fordrug delivery", Advanced Drug Delivery Reviews, vol. 54, pp. 169-190 (2002).
Lekesiz, T.O., "Preparation and characterization of polystyrene-b-poly(2-vinylpyridine) coordinated to metal or metal ion nanoparticles", J. Analytical & Applied Pyrolysis, vol. 106, pp. 81-85 (2014).
Leong, W.L. et al., "Non-Volatile Organic Memory Applications Enabled by In Situ Synthesis of Gold Nanoparticles in a Self-Assembled Block Copolymer," Adv. Mater., vol. 20, pp. 2325-2331 (2008).
Li, W.K. et al., "Encapsulation of Nanoparticles in Block Copolymer Micellar Aggregates by Directed Supramolecular Assembly", Angew. Chem. Int. Ed., vol. 50, pp. 5865-5868 (2011).
Liu, B. et al., "Janus Colloids Formed by Biphasic Grafting at a Pickering Emulsion Interface", Angew. Chem., vol. 120, pp. 4037-4039 (2008).
Liu, R. et al., "A one-step and scalable production route to metal nanocatalyst supported polymer nanospheres via flash nanoprecipitation", J. Materials Chemistry A: Materials for Energy & Sustainability, vol. 2, pp. 17286-17290 (2014).
Liu, R. et al., "Core-Shell Fe3O4 Polydopamine Nanoparticles Serve Multipurpose as Drug Carrier, Catalyst Support and Carbon Adsorbent", ACS Appl. Mater. Interfaces, vol. 5, pp. 9167-9171 (2013).
Lu, Y. et al., "Supramolecular Structures Generated by Spherical Polyelectrolyte Brushes and their Application in Catalysis", Macromol. Rapid Commun., vol. 30, pp. 806-815 (2009).
Luo, Q. et al., "Controlling the Location of Nanoparticles in Colloidal Assemblies of Amphiphilic Polymers by Tuning Manoparticle Surface Chemistry", ACS Macro Lett, vol. 2, pp. 107-111 (2013).

(56) References Cited

OTHER PUBLICATIONS

Luo, Q., "Controlling the Location of Nanoparticles in Colloidal Assemblies of Amphiphilic Polymers by Tuning Manoparticle Surface Chemistry", ACS Macro Letters, vol. 2, pp. 107-111 (2013).
Mai, Y. et al., "Controlled Incorporation of Particles into the Central Portion of Vesicle Walls," J. Am. Chem. Soc., vol. 132, pp. 10078-10084 (2010).
Mayer, A.B.R. et al., "Transition metal nanoparticles protected by amphiphilic block copolymers as tailored catalyst systems", Colloid & Polymer Science, vol. 275, pp. 333-340 (1997).
Mei, Y. et al., "Catalytic Activity of Palladium Nanoparticles Encapsulated in Spherical Polyelectrolyte Brushes and Core-Shell Microgels", Chem. Mater., vol. 19, pp. 1062-1069 (2007).
Mei, Y. et al., "High Catalytic Activity of Platinum Nanoparticles Immobilized on Spherical Polyelectrolvte Brushes", Langmuir, vol. 21, pp. 12229-12234 (2005).
Mohammed, H.S. et al., "Uniform Sub-Micron Polymer Spheres Coated with Ag Nanoparticles", Macromol. Rapid Commun., vol. 27, pp. 1774-1778 (2006).
Na, H.B. et al., "Inorganic Nanoparticles for MRI Contrast Agents", Adv. Mater., vol. 21, pp. 2133-2148 (2009).
Nieminen, J.J. et al., "Hydrogen evolution catalyzed by electrodeposited nanoparticles at the liquid/liquid interface", Chem. Commun., vol. 47, pp. 5548-5550 (2011).
Nuhn, H. et al., "Aqueous solution self-assembly of polystyrene b-poly(L-lysine) diblock oligomers", Eur. Polymer J., vol. 47, pp. 782-791 (2011).
Nuyken, O., "Polymers for Micellar Catalysis" in "Polymeric materials in organic synthesis and catalysis", Wiley-VCH, Weinheim, Germany (Jan. 1, 2003), pp. 277-304.
Peng, X. et al., "Bimetallic dendrimer-encapsulated nanoparticles as catalysts: a review of the research advances", Chem. Soc. Rev., vol. 37, pp. 1619-1628 (2008).
Pitt, C.G., "The controlled parenteral delivery of polypeptides and proteins", Int. J. Pharmaceutics, vol. 59, pp. 173-196 (1990).
Pochan, D.J. et al., "Multicompailment and multigeometry nanoparticle assembly", Soft Matter, vol. 7, pp. 2500-2506 (2011).
Rao, T. et al., "High-fidelity fabrication of Au-polymer Janus nanoparticles using a solution template approach", Soft Matter, vol. 8, pp. 2965-2971 (2012), at http://pubs.rsc.org/en/content/articlelanding/2012/sm/c2sm07002b.
Sai, H. et al., "Hierarchical Porous Polymer Scaffolds from Block Copolymers", Science, vol. 341, pp. 530-534 (2013).
Samuel, A.Z. et al., "Janus Hybramers: Self-Adapting Amphiphilic Hyperbranched Polymers", Macromolecules, vol. 15, pp. 2348-2358 (2012).
Savin et al., "Global solution properties of poly(N-vinylimidazole) in ethanol. Macromolecules and aggregates", Macromols, vol. 37, pp. 6565-6575 (2004).
Schrinner, M. et al., "Stable Bimetallic Gold-Platinum Nanoparticles Immobilized on Spherical Polyelectrolyte Brushes: Synthesis, Characterization, and Application for the Oxidation of Alcohols", Adv. Mater., vol. 20, pp. 1928-1933 (2008).
Scott, R.W.J. et al., "Bimetallic Palladium—Gold Dendrimer-Encapsulated Catalysts", J. Am. Chem. Soc., vol. 126, pp. 15583-15591 (2004).
Sharma G. et al., "Cationic Spherical Polyelectrolyte Brushes as Nanoreactors for the Generation of Gold Particles", Macromol. Rapid Commun., vol. 25, pp. 547-552 (2004).
Shen, H. et al., "Multiple pH-Induced Morphological Changes in Aggregates of Polystyrene-block-poly(4-vinylpyridine) in DMF/H20 Mixtures", J. Am. Chem. Soc., vol. 121, pp. 2728-2740 (1999).
Shenhar, R. et al., "Polymer-Mediated Nanoparticle Assembly: Structural Control and Applications", Adv. Mater., vol. 17, No. 6, pp. 657-669 (2005).
Shi, W. et al., "Gas Adsorption on Heterogeneous Single-Walled Carbon Nanotube Bundles", Phys. Rev. Lett., vol. 91, No. 1, 015504-1-015504-4 (2003).
Smoukov, S.K. et al., "Reconfigurable responsive structures assembled from magnetic Janus particles," Soft Matter, vol. 5, pp. 1285-1292 (2009).
Spatz, J.P. et al., "A Combined Top-Down/Bottom-Up Approach to the Microscopic Localization of Metallic Nanodots", Adv. Mater, vol. 14, No. 24, pp. 1827-1832 (2002).
Spatz, J.P. et al., "Ordered Deposition of Inorganic Clusters from Micellar Block Copolymer Films", Langmuir, vol. 16, pp. 407-415 (2000).
Squires, T.M. et al., "Breaking symmetries in induced-charge electro-osmosis and electrophoresis", J. Fluid Mech., vol. 560, pp. 65-101 (2006).
Sun, Q. et al., "Encapsulation of Polystyrene Latex with Temperature-Responsive Poly(N-isopropylacrylamide) via a Self-Assembling Approach and the Adsorption Behaviors Therein", Langmuir, vol. 21, pp. 5812-5816 (2005).
Suntivich, P. et al., "Gold Nanoparticles Grown on Star-Shaped Block Copolymer Monolayers", Langmuir, vol. 27, pp. 10730-10738 (2011).
Thomas, A., "Micelle Formation—Lecture: Colloidal Phenomena", pp. 1-50 (Jul. 11, 2013) at https://www.mpikg.mpg.de/886719/MicelleFormation.pdf.
Torchilin, V.P. et al., "Chelating polymer modified monoclonal antibodies for radioimmunodiagnostics and radioimmunotherapy", J Controlled Release 24: 111-118 (1993).
U.S. Appl. No. 15/121,715 Advisory Action dated Feb. 13, 2020.
U.S. Appl. No. 15/121,715 Advisory Action dated Sep. 17, 2018.
U.S. Appl. No. 15/121,715 Interview Summary dated May 9, 2017.
U.S. Appl. No. 15/121,715 Notice of Abandonment dated Jul. 17, 2020.
U.S. Appl. No. 15/121,715 Office Action dated Aug. 11, 2017.
U.S. Appl. No. 15/121,715 Office Action dated Apr. 12, 2018.
U.S. Appl. No. 15/121,715 Office Action dated Feb. 14, 2019.
U.S. Appl. No. 15/121,715 Office Action dated Sep. 4, 2019.
U.S. Appl. No. 15/121,715 Requirement for Restriction/Election dated May 9, 2017.
Valdés-Solís, T. et al., "Encapsulation of nanosized catalysts in the hollow core of a mesoporous carbon capsule", J. Catalysis, vol. 251, pp. 239-243 (2007).
Walther, A. et al., "Janus particles," Soft Matter, vol. 4, pp. 663-668 (2008).
Walther, A. et al., "Janus Particles: Synthesis, Self-Assembly, Physical Properties, and Applications", Chem. Rev., vol. 113, pp. 5194-5261 (2013).
Wang, Y. et al., "Colloids with valence and specific directional bonding", Nature, vol. 491, pp. 51-55 (2012) (6 pages).
Wang, Y. et al., "Colloids with valence and specific directional bonding", Nature, vol. 491, pp. 51-55 (Nov. 2012) doi:10.1038/nature11564.
Wen, F. et al., "One-Stage Synthesis of Narrowly Dispersed Polymeric Core-shell Microspheres", Journal Polymer Sci. Part A: Polym. Chem., vol. 46, pp. 1192-1202 (2008).
Wen, F. et al., "Synthesis of Noble Metal Nanoparticles Embedded in the Shell Layer of Core-Shell Poly(styrene-co-4-vinylpyridine) Microspheres and Their Application in Catalysis", Chem. Mater., vol. 20, pp. 2144-2150 (2008).

\* cited by examiner

HYBRID POLYMER-INORGANIC NANOCOLLOIDS AND METHODS OF MAKING THEM

This application claims the benefit of the filing date of U.S. Provisional Application 62/619,396, filed Jan. 19, 2018, which is hereby incorporated by reference in its entirety herein.

This invention was made with government support under Grant No. FA9550-12-1-0223 awarded by the Air Force Office of Scientific Research and Grant No. DMR-1420541 awarded by the National Science Foundation. The government has certain rights in the invention.

FIELD OF THE INVENTION

The present invention pertains to hybrid polymer-inorganic nanocolloids and methods of making them.

BACKGROUND OF THE INVENTION

In Pierre Gilles de Gennes's 1991 Nobel Laureate speech entitled "Soft Matter" he introduced the concept of Janus particles, which are anisotropically structured particles containing two distinct regions of material or functionality. Their development can be considered in the context of the scientific and technological development of other chemically anisotropically structured materials, such as surfactants and block copolymers. The ability to synthesize surfactants at scale and in cost effective ways has led to the current surfactant market. The ability to synthesize block copolymers at scale and in cost effective ways has led to the current market for thermoplastic elastomers based on block copolymers.

SUMMARY

In an embodiment, a Janus nanocolloid of the present invention can include a first polymer, a second polymer, a first region having a first surface, a second region having a second surface, and a metal catalyst, with the metal catalyst adhered to less than an entire surface formed by the first surface and the second surface.

In an embodiment, the first region can include the first polymer at a greater weight fraction than the second polymer, and the second region can include the second polymer at a greater weight fraction than the first polymer. The first region can be in contact with the second region, and the first surface may be in contact with the second surface, such that a contact line can be formed where the first surface contacts the second surface.

In an embodiment, the metal catalyst can adhere to the contact line. In an embodiment, the metal catalyst can adhere to the first surface.

In an embodiment, a volume of the first region may be greater than a volume of the second region. In an embodiment, a volume of the first region may be substantially the same as a volume of the second region. In an embodiment, the volume of the first region is greater than the volume of the second region. In an embodiment, the volume of the first region is substantially the same as the volume of the second region.

In an embodiment, the first polymer is polystyrene (PS), amine-terminated polystyrene (PS-NH$_2$), polyisoprene (PI), polybutadiene (PB), poly(lactic acid) (PLA), poly(vinylpyridine) (PVP), polyvinylcyclohexane (PVCH), poly(methylmethacrylate) (PMMA), polycaprolactone (PCL), polyamide, polysulfone, epoxy, epoxyresin, silicon rubber, silicon polymer, polyimide, a polymer with a functionalized end-group, or blends or copolymers of these. The second polymer can be polystyrene (PS), amine-terminated polystyrene (PS-NH$_2$), polyisoprene (PI), polybutadiene (PB), poly(lactic acid) (PLA), poly(vinylpyridine) (PVP), polyvinylcyclohexane (PVCH), poly(methylmethacrylate) (PMMA), polycaprolactone (PCL), polyamide, polysulfone, epoxy, epoxyresin, silicon rubber, silicon polymer, polyimide, a polymer with a functionalized end-group, or blends or copolymers of these. The first polymer and the second polymer can be different. For example, the first polymer can be polystyrene (PS) or amine-terminated polystyrene (PS-NH$_2$) and the second polymer can be polyisoprene (PI).

In an embodiment, the metal catalyst can be a chelated metal nanocatalyst. The metal catalyst can be a citrate-stabilized metal nanocatalyst with the metal being gold, silver, copper, nickel, palladium, platinum, iron, cobalt, or zinc. The metal catalyst can be a citrate-stabilized gold nanocatalyst.

In an embodiment, the Janus nanocolloid may further include a surfactant. The surfactant can be a non-ionic surfactant. In an embodiment, the non-ionic surfactant can be polyethylene glycol (PEG), polyethylene glycol alkyl ether (for example, octaethylene glycol monododecyl ether or pentaethylene glycol monododecyl ether), polypropylene glycol alkyl ether, glucoside alkyl ether (for example, decyl glucoside, lauryl glucoside, or octyl glucoside), polyethylene glycol octylphenyl ether (for example, Triton X-100), polyethylene glycol alkylphenyl ether (for example, Nonoxynol-9), glycerol alkyl esters (for example, glyceryl laurate), polyoxyethylene glycol sorbitan alkyl ester (for example, polysorbate 8 or Tween80), sorbitan alkyl ester (for example, Spans), cocamide MEA (for example, cocamide DEA), dodecydimethylamine oxide, a block copolymer of polyethylene glycol and polypropylene glycol (for example, Poloxamer), polyethoxylate tallow amine (for example, POEA), or a combination of these.

A method of forming a metal-polymer hybrid Janus nanocolloid includes dissolving a first polymer at a first concentration and a second polymer at a second concentration in a solvent to form a polymer solution, selecting a nonsolvent, dissolving a metal salt and a chelating agent in the nonsolvent, and continuously mixing the polymer solution with the nonsolvent to flash precipitate the metal-polymer hybrid Janus nanocolloid. A surfactant, for example, a non-ionic surfactant, can be dissolved in the nonsolvent.

Methods according to the invention use Flash NanoPrecipitation (FNP) to produce metal-polymer hybrid Janus nanocolloids by impinging a polymer solution including two or more dissolved polymers with a nonsolvent in a confined volume to achieve phase separation of the polymers. FNP is a single-step, low energy, continuous, and rapid process that can be used to create polymer:polymer and polymer:inorganic nanoparticles.

Figure 1:
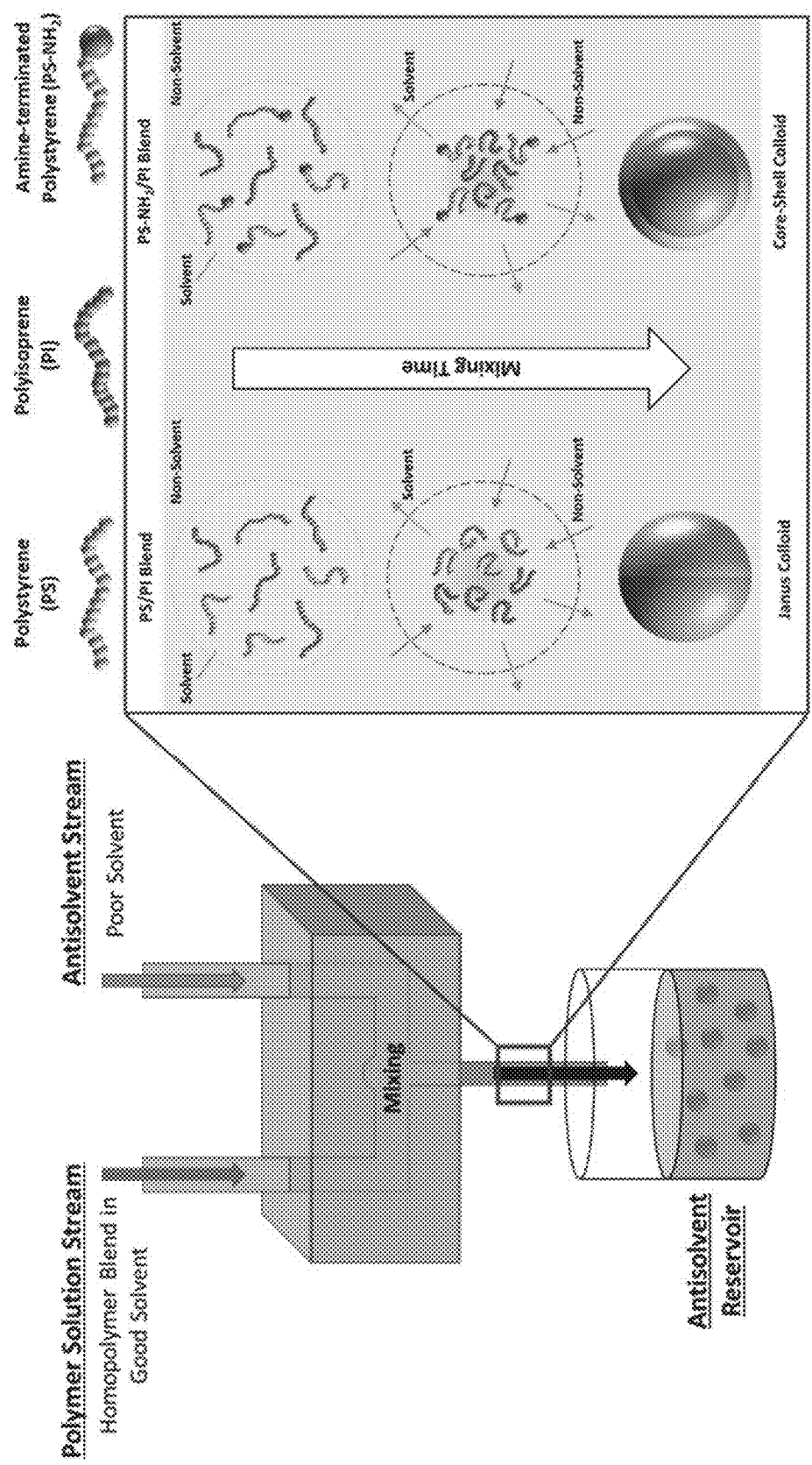
FIG. 1 shows the FNP process and a cartoon of the mechanism of nanocolloid formation. A schematic of the FNP process is shown at the left of FIG. 1.

At the right of FIG. 1 is illustrated the mechanism of nanocolloid formation upon rapid mixing and solvent exchange using a blend of polystyrene (PS) and polyisoprene (PI) in the feed stream to form Janus nanocolloids or a blend of amine-terminated PS (PS-NH$_2$) and PI in the feed stream to form core-shell nanocolloids.

Figure 2:
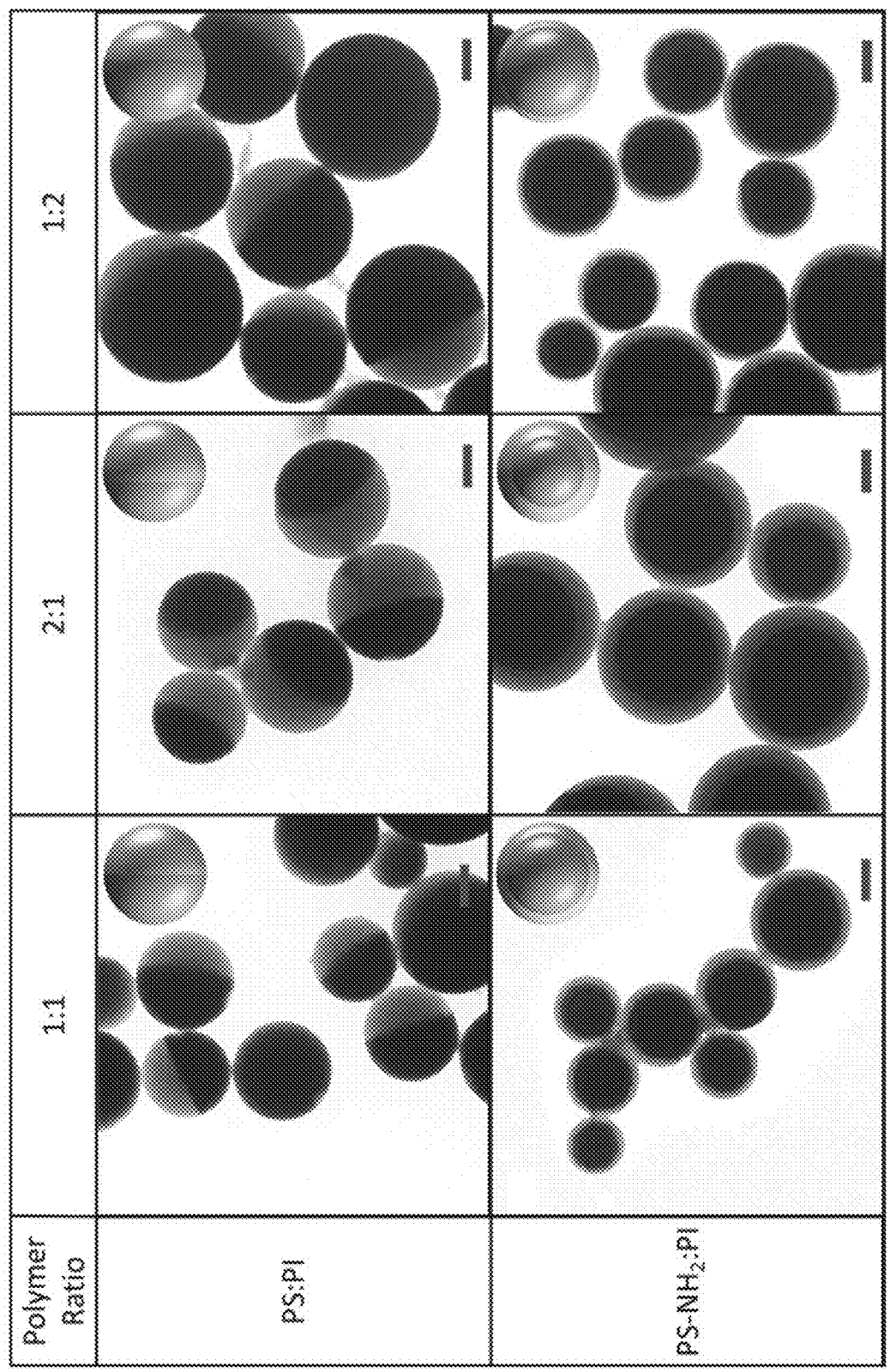

FIG. 2 shows TEM images of polymer nanocolloids formed via FNP with variation of the ratio of homopolymers in the feed stream. Blends of PS and PI in the feed stream form Janus nanocolloids (three upper boxes) while blends of PS-NH$_2$ and PI form core-shell nanocolloids (three lower boxes). The ratio of PS or PS-NH$_2$ to PI are 1:1 upper and lower left boxes), 2:1 (upper and lower middle boxes), and 1:2 (upper and lower right boxes). PI, stained with OsO$_4$, is the darker domain in the images and the darker domain in the cartoon (schematic) shown at upper right of each box (PI is at left of the upper cartoons and in the center of the lower cartoons), and PS or PS-NH$_2$ is lighter gray in the images and lighter gray in the schematics (PS or PS-NH$_2$ is at right of the upper cartoons and in the outer shell of the lower cartoons). The scale bar in each image is 200 nm.

Figure 3:
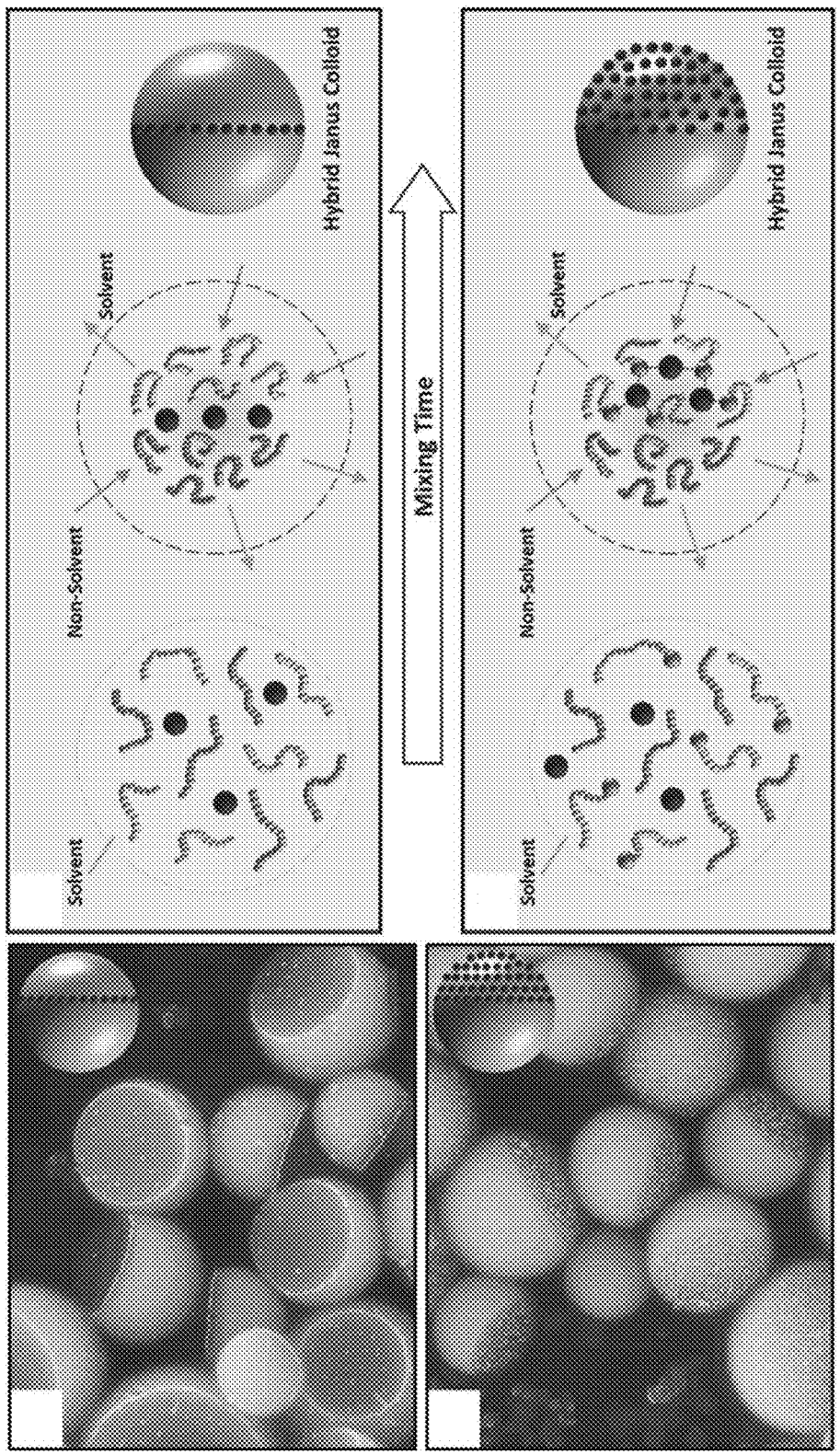

FIG. 3 shows SEM images of nanocolloids and schematic illustrations of nanocolloid formation. The upper and lower left boxes of FIG. 3 show SEM images of nanocolloids. The upper and lower right boxes of FIG. 3 are schematic illustrations of nanocolloid formation with a blend of homopolymers and citrate-stabilized Au nanocatalyst. The upper-right box of FIG. 3 illustrates nanocolloids of PS/PI (SEM images shown in the upper-left box of FIG. 3) displaying Au nanocatalyst aligned at the PS/PI interface, because the neutral surface of the Au nanocatalyst does not favor interactions with either homopolymer. The lower-right box of FIG. 3 shows PS-NH$_2$/PI nanocolloids (SEM images shown in the lower-left box of FIG. 3) adopting a Janus morphology with Au nanocatalyst dispersed exclusively on the PS-NH$_2$ domain due to the attractive electrostatic interactions between the amine groups of the PS-NH$_2$ polymer chains and the citrate groups on the Au nanocatalyst. In the SEM images the stained PI is the light gray region, the PS or PS-NH$_2$ is the darker gray, and the small bright dots are Au nanocatalyst. A polymer ratio of 1:2 PS or PS-NH$_2$ to PI was used. The scale bar in all images is 200 nm.

Figure 4:
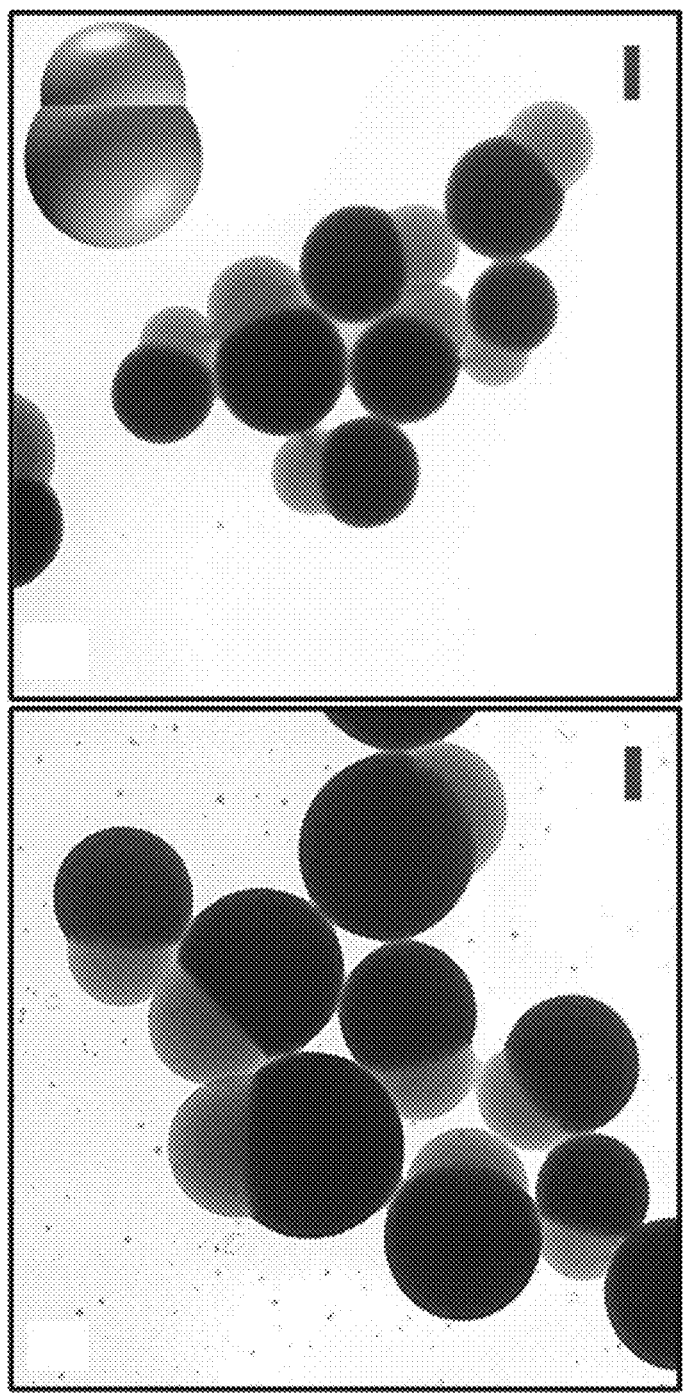

FIG. 4 shows TEM images of PS/PI (left box) and PS-NH$_2$/PI (right box) "snowman" Janus nanocolloids after addition of Tween 80. PI, stained with OsO$_4$, is the darker domain in the images and the darker domain in the cartoon (schematic) in the right box (the PI is the left domain in the cartoon), and PS or PS-NH$_2$ is lighter gray in the images and lighter gray in the cartoon (the PS or PS-NH$_2$ is the right domain in the cartoon). A polymer ratio of 1:2 PS or PS-NH$_2$ to PI was used. The scale bar in all images is 200 nm.

Figure 5:
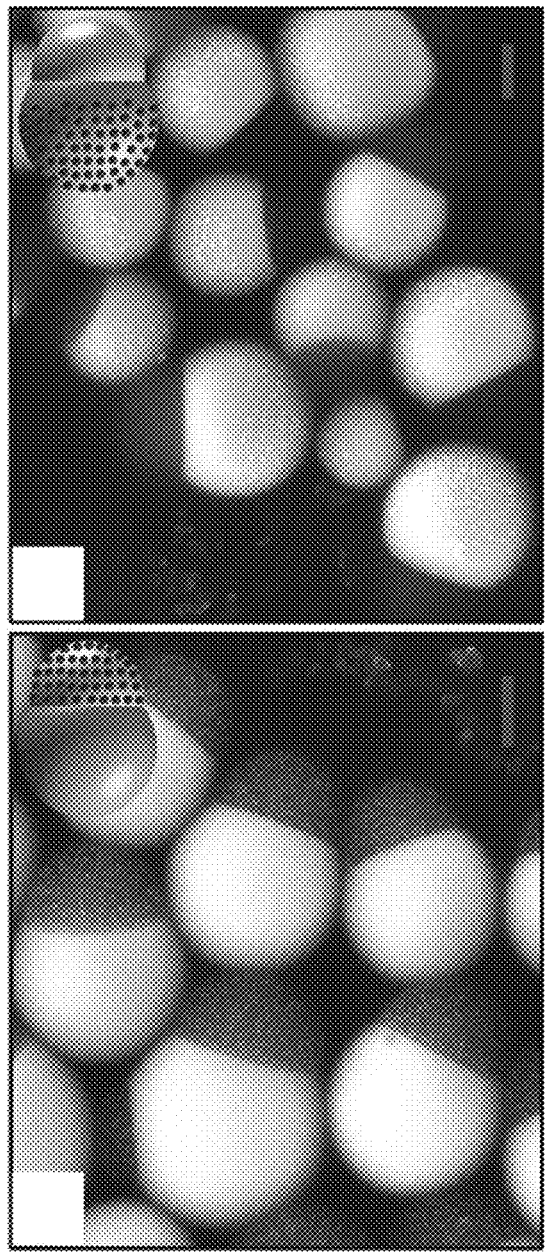

FIG. 5 shows SEM images of nanocolloids prepared with a PS-NH$_2$/PI blend. These images show that the Au nanocatalyst is exclusively dispersed in the PS-NH$_2$ domain (left box), while nanocolloids prepared with a PS/PI blend had Au nanocatalyst dispersed exclusively in the PI domain (right box). PI, stained with OsO$_4$, is the light gray domain in the images and the darker domain in the cartoon (schematic) at upper left of each box (PI is the left domain in the cartoons), and PS or PS-NH$_2$ is darker gray in the images and the lighter domain in the cartoons (PS or PS-NH$_2$ is the right domain in the cartoons). The Au nanocatalysts are the small bright dots in the images. A polymer ratio of 1:2 PS or PS-NH$_2$ to PI was used. The scale bar in each image is 500 nm.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

Published international applications WO2015/200054 (filed Jun. 16, 2015; published Dec. 30, 2015) and WO2015/130835 (filed Feb. 25, 2015; published Sep. 3, 2015) are hereby incorporated by reference in their entirety.

The terms "particle", "nanoparticle", "colloid", and "nanocolloid" are used interchangeably herein, unless another meaning is indicated by the context. The term "Janus" refers to a particle having two distinct surfaces, for example, having two surfaces of different polymers. The term "Janus" can also refer to a characteristic of such a particle or group of particles, such as "Janus morphology" or "Janus phase".

Methods according to the invention apply to a broad range of polymer chemistries and cost effective processes to produce Janus particles. Processes according to the invention can produce bi- or tri-phasic, polymeric Janus particles which have distinct polymer chemistry in the phases and which have distinct surface chemistries on the faces.

Flash NanoPrecipitation

Flash NanoPrecipitation (FNP) can be used for the production of organic and organic/inorganic nanoparticles. The mean particle diameter of these nanoparticles can be in the range of from 30 to 2000 nm, for example, from about 50 to 800 nm. For example, the mean particle diameter of these nanoparticles can be from about 10, 20, 30, 50, 60, 100, 200, 300, 500, 800, 1000, 1200, 1500, 2000, 4000, 5000, 6000, or 10,000 nm to about 20, 30, 50, 60, 100, 200, 300, 500, 800, 1000, 1200, 1500, 2000, 4000, 5000, 6000, 10,000, or 20,000 nm. FNP can form particles of narrow size distribution. For example, of the nanoparticles formed, at least 90% can have a diameter less than 800 nm, and at most 10% can have a diameter less than 50 nm. For example, of the nanoparticles formed, at least 90% can have a diameter less than 50,000, 20,000, 10,000, 6000, 5000, 4000, 2000, 1000, 800, 500, 200, 100, 60, 50, 30, 20, or 10 nm, and at most 10% can have a diameter less than 20,000, 10,000, 6000, 5000, 4000, 2000, 1000, 800, 500, 200, 100, 60, 50, 30, 20, 10, or 5 nm.

The FNP process uses micromixing geometries to mix an incoming, miscible solvent stream in which a polymer is dissolved (so that it can also be termed a polymer solution stream) with a non-solvent stream to produce supersaturation levels as high as 10,000 with mixing times of about 1.5 ms. For example, supersaturation levels can range from about 100, 300, 1000, 3000, 10,000, 30,000, 100,000, or 300,000 to about 300, 1000, 3000, 10,000, 30,000, 100,000, 300,000, or 1,000,000, and mixing times can range from about 0.01, 0.03, 0.1, 0.3, 1, 1.5, 3, 10, 15, 30, 100, or 300 ms to about 0.03, 0.1, 0.3, 1, 1.5, 3, 10, 15, 30, 100, 300, or 1000 ms. It is desirable that these mixing times are shorter than the nucleation and growth times of nanoparticle assembly, so that the size of the nanoparticles formed is constrained. The solvent stream and non-solvent stream can be further mixed with a collection solution, for example, a collection solution that includes a stabilizer such as an amphiphilic surfactant molecule. Nanoparticles can be formed for a variety of pharmaceutical compound, imaging agent, security ink, and drug targeting applications (Johnson, B. K. et al., Chemical processing and micromixing in confined impinging jets, AIChE J. September 2003, 49(9), 2264-2282; Johnson B. K. et al., Mechanism for rapid self-assembly of block copolymer nanoparticles, Phys. Rev. Lett. Sep. 12, 2003, 91(11); Johnson, B. K. et al. Flash NanoPrecipitation of organic actives and block copolymers using a confined impinging jets mixer, Australian J. Chem. 2003, 56(10), 1021-1024; Johnson, B. K. et al., Nanoprecipitation of organic actives using mixing and block copolymer stabilization, Abstracts of Papers of the American Chemical Society September 2003, 226, U487-U487; Johnson B. K. et al., Engineering the direct precipitation of stabilized organic and block copolymer nanoparticles as unique composites, Abstracts of Papers of the American Chemical Society September 2003, 226, U527-U527; Johnson, B. K. et al., Nanoprecipitation of pharmaceuticals using mixing and block copolymer stabilization, Polymeric Drug Delivery II: Polymeric Matrices and Drug Particle Engineering 2006, 924, 278-291; Ansell, S. M. et al., Modulating the therapeutic activity of nanoparticle delivered paclitaxel by manipulating the hydrophobicity of prodrug conjugates, J. Med. Chem. June 2008, 51(11), 3288-3296; Gindy, M. E. et al. Preparation of Poly(ethylene glycol) Protected Nanoparticles with Variable Bioconjugate Ligand Density, Biomacromolecules October 2008, 9(10), 2705-2711; Gindy, M. E. et al., Composite block copolymer stabilized nanoparticles: Simultaneous encapsulation of organic actives and inorganic nanostructures, Langmuir January 2008, 24(1), 83-90; Akbulut M. et al., Generic Method of Preparing Multifunctional Fluorescent Nanoparticles Using Flash NanoPrecipitation, Adv. Funct. Mater. 2009, 19, 1-8; Budijono, S. J. et al., Exploration of Nanoparticle Block Copolymer Surface Coverage on Nanoparticles, Colloids and Surfaces A—Physicochemical and Engineering Aspects, 2010; Budijono, S. J. et al., Synthesis of Stable Block-Copolymer-Protected NaYF4:Yb3+, Er3+ Up-Converting Phosphor Nanoparticles, Chem. Mat. 2010, 22(2), 311-318; D'Addio, S. M. et al., Novel Method for Concentrating and Drying Polymeric Nanoparticles: Hydrogen Bonding Coacervate Precipitation, Molecular Pharmaceutics March-April 2010, 7(2), 557-564; Kumar, V. et al., Fluorescent Polymeric Nanoparticles: Aggregation and Phase Behavior of Pyrene and Amphotericin B Molecules in Nanoparticle Cores, Small December 2010, 6(24), 2907-2914; Kumar, V. et al., Stabilization of the Nitric Oxide (NO) Prodrugs and Anticancer Leads, PABA/NO and Double JS-K, through Incorporation into PEG-Protected Nanoparticles, Molecular Pharmaceutics January-February 2010, 7(1), 291-298; D'Addio, S. M. et al., Controlling drug nanoparticle formation by rapid precipitation, Adv. Drug Delivery Rev. May 2011, 63(6), 417-426; Kumar, V. et al., Fluorescent Polymeric Nanoparticles: Aggregation and Phase Behavior of Pyrene and Amphotericin B Molecules in Nanoparticle Cores, Small December 2011, 6(24), 2907-2914; Shan, J. N. et al., Pegylated Composite Nanoparticles Containing Upconverting Phosphors and meso-Tetraphenyl porphine (TPP) for Photodynamic Therapy, Adv. Functional Materials July 2011, 21(13), 2488-2495; Shen, H. et al., Self-assembling process of flash nanoprecipitation in a multi-inlet vortex mixer to produce drug-loaded polymeric nanoparticles, J. Nanoparticle Res. September 2011, 13(9), 4109-4120; Zhang, S. Y. et al., Photocrosslinking the polystyrene core of block-copolymer nanoparticles, Polym. Chem. March 2011, 2(3), 665-671; Zhang, S. Y. et al., Block Copolymer Nanoparticles as Nanobeads for the Polymerase Chain Reaction, Nano Lett. April 2011, 11(4), 1723-1726; D'Addio, S. M. et al., Constant size, variable density aerosol particles by ultrasonic spray freeze drying, Int'l J. Pharmaceutics May 2012, 427(2), 185-191; D'Addio, S. M. et al., Effects of block copolymer properties on nanocarrier protection from in vivo clearance, J. Controlled Release August 2012, 162(1), 208-217; D'Addio, S. M. et al., Optimization of cell receptor-specific targeting through multivalent surface decoration of polymeric nanocarriers, J. Controlled Release May 2013, 168(1), 41-49; Figueroa, C. E. et al., Effervescent redispersion of lyophilized polymeric nanoparticles, Therapeutic Delivery 2013, 4(2), 177-190; Figueroa, C. E. et al., Highly loaded nanoparticulate formulation of progesterone for emergency traumatic brain injury treatment, Therapeutic Delivery 2013, 3(11), 1269-1279; Pinkerton, N. M. et al., Formation of Stable Nanocarriers by in Situ Ion Pairing during Block-Copolymer-Directed Rapid Precipitation, Mol. Pharmaceutics 2013, 10, 319-328; Pinkerton, N. M. et al., Gelation Chemistries for the Encapsulation of Nanoparticles in Composite Gel Microparticles for Lung Imaging and Drug Delivery, Biomacromolecules 2013; DOI: 10.1021/bm4015232). Flash NanoPrecipitation can be used with stabilizing block copolymers to produce nanoparticles. Alternatively, FNP can be used for the production of homopolymer particles without an added stabilizer or amphiphilic copolymer. Nanoparticles over the size range of 60 to 200 nm with polydispersities comparable to those produced by emulsion polymerization were obtained using only electrostatic stabilization.

A polymer and/or copolymer can be dissolved to form the polymer solution process stream at a concentration in a range of from about 0.1 wt %, 0.2 wt %, 0.5 wt %, 1 wt %, 2 wt %, 5 wt %, 10 wt %, or 20 wt % to about 0.2 wt %, 0.5 wt %, 1 wt %, 2 wt %, 5 wt %, 10 wt %, 20 wt %, or 40 wt %. A person of skill in the art will appreciate that a factor such as the economics of a process can constrain a lower bound of concentration, and that factors such as the viscosity of the process solution or the solubility limit of the copolymer in the polymer solution process stream can constrain an upper bound of concentration. For example, if the viscosity of the polymer solution process stream is much greater than that of the non-solvent stream, mixing of the first process solution with the non-solvent stream may be inhibited. A person of skill in the art will appreciate that factors such as the molecular weight of the copolymer and the composition of the copolymer can affect the maximum concentration that can be attained in the polymer solution before the viscosity becomes too high.

FNP overcomes the limitations of previous approaches that did not control the size of the assembled nanoparticles, were unable to produce nanoparticles with controlled stoichiometry, and were slow and not scalable. With FNP nanoparticle size can be controlled. Rapid micromixing to a uniform high supersaturation produces diffusion limited aggregation, and the aggregating solutes or polymers "stick" randomly to each other, so that each particle contains the stoichiometric ratio of solutes that are introduced into the FNP micromixer. Although the process is random, because each nanoparticle contains polymer chains on the order of 50,000 Da molecular weight, the variance in concentration between particles is small. The FNP process takes on the order of 15 ms for particle formation. The FNP process has been scaled to 1400 kg/day by BASF.

Thus, FNP is a room temperature, low energy, one-step, rapid, and continuous route to produce polymer-polymer Janus nanoparticles. The mixing occurs in a central cavity 3 fed by two incoming streams that are high velocity linear jets of fluid. The one stream contains the polymers dissolved in a solvent (polymer solution stream). The other stream is of an anti-solvent for the polymer (non-solvent stream). The compositions and ratios of the streams are chosen so that after mixing in the central cavity, the polymers are no longer dissolved and rapid precipitation occurs (Johnson, B. K. et al., AIChE J. 2003, 49, 2264; Johnson, B. K. et al., Phys. Rev. Lett. 2003, 91; Johnson, B. K. et al., Aust. J. Chem. 2003, 56, 1021; Pustulka, K. M. et al., Mol. Pharmaceutics, 2013, 10, 4367). The nanoparticles formed can be collected in a collection solution. Different mixing geometries can be used in this process, as long as the selected mixing geometry produces rapid micromixing to control precipitation (Burke, P. A. et al., International Patent Application PCT/US2011/031540 and U.S. Published Patent Application US20130037977). The polymer solution rapidly mixes with the non-solvent for a few milliseconds to induce self-assembly of the polymers into kinetically frozen nanoparticles. When used to form polymeric Janus particles, two polymers may be dissolved in the solvent (e.g., an organic solvent) to form the polymer solution stream. However, other hydrophobic components such as small molecule drugs, imaging agents, particles, and therapeutic agents can be successfully encapsulated into polymeric nanoparticles by FNP (Shan, J. et al, Adv. Funct. Mater. 2011, 21, 2488; Kumar, V. et al., Small 2010, 6, 2907; Pinkerton, N. M. et al., Biomacromolecules 2014, 15, 252).

A wide range of solvents and non-solvents that are miscible can be used in the process. Solvents include materials in which the polymer components are soluble. The solvent can be miscible with the non-solvent. Non-solvents include materials in which the polymer components are not soluble or are only sparingly soluble. For example, the solvent can be a non-aqueous solvent, such as an organic solvent or a low polarity solvent, and the non-solvent can be water, a predominantly aqueous phase, or a high polarity solvent. Alternatively, the solvent can be water or a high polarity solvent (for example, if the polymer to be dissolved is a hydrophilic polymer) and the non-solvent can be a non-aqueous solvent or a low polarity solvent. Alternatively, the solvent and the non-solvent can be selected from two different non-aqueous solvents. The solvent or the non-solvent can be polar or nonpolar (or have an intermediate polarity) and can be protic or aprotic. Examples of materials that can be used as solvents or non-solvents include water, alcohols, such as methanol, ethanol, isopropanol (2-propanol), and n-propanol (1-propanol), carboxylic acids, such as formic acid, acetic acid, propanoic acid (propionic acid), butyric acid, furans, such as tetrahydrofuran (THF), dioxane, 1,4-dioxane, furfuryl alcohol, ketones, such as acetone and methyl ethyl ketone (MEK), other water-miscible solvents, such as acetaldehyde, ethylene glycol, propanediol, propylene glycol (propane-1,2-diol), 1,3-propanediol, butanediol, 1,2-butanediol, 1,3-butanediol, 1,4-butanediol, pentanediol, 1,5-pentanediol, 2-butoxyethanol, glycerol, triethylene glycol, dimethyl sulfoxide (DMSO), ethylamine, diethanolamine, diethylenetriamine, methyl diethanolamine, dimethylformamide (DMF), and pyridine, acetonitrile, methyl isocyanide, esters, such as methyl acetate and ethyl acetate, ethers, such as diethyl ether and dimethoxyethane, carbon disulfide, halogenated organics, such as carbon tetrachloride, alkanes, such as heptane, alkenes, such as hexene, cycloalkanes, such as cyclohexane, aromatic hydrocarbons, such as toluene, other organic and inorganic materials, and mixtures of these. Other non-liquid compounds that aid in the solvent quality of the streams may be added and are also considered part of the solvent. For example, a surfactant, a salt, or a cosolvent may be added to a solvent and considered part of the solvent. These excipient compounds may or may not be in the final nanoparticle or microparticle construct, depending on the requirements of the final product. A further description of solvent compositions useful for processing by FNP has been presented in B. K. Johnson & R. K. Prud'homme, U.S. Patent Application Pub. US 2012/0171254 A1, Jul. 5, 2012.

FNP is useful in producing homogenous nanoparticles of various polymers including polystyrene, polymethylmethacrylate, polylactic acid, polycaprolactone, and polyethylene oxide with controlled diameters and narrow polydispersity indexes (PDIs) (Kumar V. et al., Preparation of lipid nanoparticles: Google Patents, 2013 (EP2558074)). Neither premade nanoparticles nor immobilization steps are required for the FNP process. By simply adjusting the initial polymer concentrations, it is possible to tune the anisotropy of the Janus nanoparticles. Hybrid polymer-inorganic Janus nanoparticles can be made by the FNP process. FNP has been described in the following patent documents, which are incorporated by reference into this submission in their entirety:

Preparation of Lipid Nanoparticles, M. Gindy, et al., US Patent Publication, US20130037977 A1, PCT/US2011/031540, publication date Feb. 14, 2013;

A high-loading nanoparticle-based formulation for water-insoluble steroids, C. Figureroa et al., Patent Publication, WO2013063279 A1, PCT/US2012/061945, publication date May 2, 2013;

Particulate constructs for release of active agents, L. D. Mayer et al., Patent Publication US20130336915 A1, Publication date Dec. 19, 2013; and Process and Apparatuses for Preparing Nanoparticle Compositions with Amphiphilic Copolymers and Their Use, B. K. Johnson et al., US Patent Application Pub., US 2012/0171254 A1, Jul. 5, 2012.

The production of single component polymer nanoparticles by FNP has been described in Zhang, C. et al., Flash nanoprecipitation of polystyrene nanoparticles, *Soft Matter* 2012, 8(1), 86-93, which is also incorporated herein by reference in its entirety.

The FNP process requires adequate micromixing, which has been described in the patents above. FNP requires that the polymers or inorganic colloids of interest be mutually soluble in a common organic process solvent which is miscible with the non-solvent stream. Water or an aqueous solution can be used as the non-solvent stream and a water-miscible organic solvent can be used as the process solvent stream (i.e., to form the polymer solution stream). With the polymer additives the convergence of the two streams produces a dispersed Janus nanoparticle dispersion in the mixed solvent phase.

The FNP process may be run without a stabilizer additive, so that the process solvent contains the polymers and/or colloids of interest without an amphiphilic stabilizer. Alternatively, amphiphilic stabilizers may be added to either the process solvent phase or the non-solvent phase. It is also possible to reverse the solvent polarity and to precipitate water soluble Janus particles in a non-aqueous non-solvent phase.

Particles may be produced by the FNP process to have, for example, diameters between 10 nm and 4000 nm, between 20 nm and 1000 nm, or between 50 nm and 800 nm. The sizes are the intensity weighted average size determined by dynamic light scattering. Such measurements can be conducted in a Malvern Nanosizer dynamic light scattering (DLS) instrument. The size reported by dynamic light scattering is the intensity weighted diameter, which is used herein to report sizes of the particles produced by the Flash NanoPrecipitation process. The breadth of distribution of the particle diameters can be characterized by values such as the Di90, the intensity-weighted diameter where 90% of the particles have a lesser diameter, the Di50, the intensity-weighted diameter where 50% of the particles have a lesser diameter, and the Di10, the intensity-weighted diameter where 10% of the particles have a lesser diameter. For example, to define a minimum narrowness of distribution of particle diameters, it can be specified that at least 90% of the particles have a diameter less than a nominal Di90 value and that at most 10% of the nanoparticles formed have a diameter less than a nominal Di10 value, or that 80% of the nanoparticles have a diameter greater than or equal to the nominal Di10 value and less than the nominal Di90 value. Alternatively, the Span can be defined as the difference between the Di90 and Di10 values divided by the Di50 value, that is, Span=(Di90−Di10)/Di50. A smaller Span indicates a more narrow distribution of particle sizes, with a Span of zero indicating a monodisperse distribution (i.e., all particles have the same size). The Di10, Di50, and Di90 values are determined from the intensity weighted distribution that is obtained from the dynamic light scattering measurement. These values can be calculated on a mass-weighted basis using standard conversions from intensity- to mass-weighted distributions.

Nanoparticles formed by FNP can include a stabilizing polymer, such as a copolymer of a more polar block coupled with a more nonpolar (less polar) block. The term "block" may be interpreted as either a distinct domain with a single molecular composition, or it may mean a region of the polymer chain which has regions that are predominantly more polar and other regions that are less polar. The polarity may be imparted by the monomers comprising the polymer backbone or grafted pendant groups or chains attached to the main polymer backbone. For example, the copolymer may be amphiphilic (the more nonpolar block is not water soluble), however, this is not a requirement and copolymers may be fully water soluble or fully non-water soluble, as long as solubilities of the blocks differ significantly enough in the nonprocess solvent. The copolymer should self-assemble in the nonprocess solvent, with the more polar blocks precipitating and the more nonpolar blocks remaining soluble. When used in the FNP process to make particles, the more polar blocks go to the core of the particle, and the more nonpolar blocks form a sterically protective shell. The sterically protective shell prevents particle aggregation and prevents percolation of encapsulated material during post processing steps.

Nanoparticles formed by the disclosed process can be formed with graft, block, or random copolymers. For example, these copolymers can have a molecular weight between about 1000 g/mol and about 1,000,000 g/mol, or between about 3000 g/mol and about 25,000 g/mol, or at least about 2000 g/mol.

The copolymers are comprised of repeat units or blocks that have different solubility characteristics. Typically, these repeat units are in groups of at least two comprising a block of a given character. Depending on the method of synthesis, these blocks could be of all the same repeat unit or contain different repeat units dispersed throughout the block, but still yielding blocks of the copolymer with polar and more non-polar portions. These blocks can be arranged into a series of two blocks (diblock) or three block (triblock), or more (multiblock), forming the backbone of a block copolymer. In addition, the polymer chain can have chemical moieties covalently attached or grafted to the backbone. Such polymers are graft polymers. Block units making up the copolymer can occur in regular intervals or they can occur randomly making a random copolymer. In addition, grafted side chains can occur at regular intervals along the polymer backbone or randomly making a randomly grafted copolymer. In graft polymers, polar blocks may be grafted on a non-polar polymer. More commonly, non-polar blocks are grafted on a more polar polymer chain. In graft copolymers, the length of a grafted moiety can vary. Preferably, the grafted segments are equivalent to 2 to 22 ethylene units in length. The grafted hydrophobic groups which create at least one less polar region of the copolymer may comprise tocopherol, tocopherol derivatives, lipids, alcohols with carbon numbers from 12 to 40, cholesterols, unsaturated and/or hydrogenated fatty acids, salts, esters or amides thereof, fatty acids mono-, di- or triglycerides, waxes, ceramides, cholesterol derivatives, or combinations. In addition, the grafting of the polymer backbone can be useful to enhance solvation or nanoparticle stabilization properties. The terms polar and non-polar can be understood in a relative sense. For example, the polarity of two blocks in a block copolymer may be sufficiently different, so that the block copolymer is suitable for use in forming nanoparticles using FNP, although the "non-polar" block may be somewhat polar.

The copolymer used in the compositions and methods of the invention may be comprised of blocks of at least two repeat units or with a minimum contour length the equivalent of at least 25 ethylene units. Contour lengths are the linear sum of the polymer backbone, the molecular dimensions of which can be approximated using the Polymer Handbook, 4th Edition, eds. J. Brandrup, E. H. Immergut, and E. A. Grulke, assoc. ed. A. Abe, D. R. Bloch, 1999, New York, John Wiley & Sons, which is hereby incorporated by reference in its entirety.

Polymer Nanocolloids

Geometrically-structured polymer nanocolloids, including Janus nanocolloids have useful properties derived from their anisotropy. Controlled surface decoration with inorganic nanoparticles can induce another level of functionality into structured nanocolloids that can enable applications in fields ranging from re-writeable electronics to biphasic catalysis.

Geometrically structured polymer nanocolloids such as Janus particles (i.e., particles with two distinct "faces"), patchy particles, and ellipsoidal particles can exhibit self-assembly behavior.[1-8] Surface decoration with inorganic materials can introduce another level of functionality into structured nanocolloids for applications ranging from photonics to nanomedicine.[9-12] Control over the geometry as well as the functionality of the nanocolloid surface therefore enables new applications. For instance, in bio-refining, reactions at liquid-liquid interfaces carried out via emulsions that are stabilized by molecular surfactants can involve phase transfer catalysts which are soluble in only one phase to initiate reactions.[13] The yield and selectivity of these reactions can be improved by the development of amphiphilic Janus nanocolloids in which the nanocolloid acts as the emulsion stabilizer and one face is functionalized with the catalyst.[14-16] Fabrication processes to prepare structured nanocolloids in which functionality is introduced by organizing inorganic nanomaterials atop the nanocolloid surface can require multiple steps and long residence times.[17-20] A one-step, efficient, cost-effective, and scalable process is advantageous. Flexibility within a single production platform to make a range of nanocolloids and functionalize them with inorganic materials is attractive.

Flash NanoPrecipitation (FNP) of a polymer mixture against an anti-solvent can direct the self-assembly of polymers into the Janus morphology.[21] FNP operates by inducing precipitation of polymers upon solvent exchange, but differs from other precipitation-based approaches, because of its significantly more rapid mixing within a confined volume, producing supersaturation on a millisecond timescale.[22-24] As a result, polymer nanocolloids are produced with tunable sizes from 50-1000 nm and with narrow size distributions. Through FNP, the size, surface anisotropy, and surface functionality of Janus nanocolloids can each be controlled independently. Moreover, FNP allows for the ability to generate more complex structures including patchy and Cerberus nanocolloids (i.e., colloids with more than two "faces"), expanding the number of accessible hybrid material architectures.[21] FNP is a one-step, scalable process that can generate hybrid polymer-inorganic Janus nanocolloids in which one phase is selectively decorated with a metal catalyst. Such hybrid polymer-inorganic Janus nanocolloids can be used as emulsion-stabilizing, phase-selective catalytic materials. By modifying the polymer end group functionality, the location of the metal catalyst in or on the polymer Janus nanocolloids can be controlled, for example, the metal catalyst can be located at the circumference of the nanocolloid. Furthermore, simple molecular additives may be added during processing and can alter the nanocolloid geometry, as well as modulate the location of the metal catalyst. Considering its continuous and facile operation, as well as the variety of products it can form, the FNP process offers a versatile approach to mass produce structured functional nanocolloids that can enable new technologies.

FIG. 1 at left schematically illustrates the experimental setup for the FNP system used for the production of nanocolloids.[22,25,26] The solution stream and the anti-solvent stream can be input and turbulently mixed within a confined volume. The flow rates of the solution stream and the anti-solvent stream can be the same or different. Rapid solvent/anti-solvent exchange induces the spatially homogenous precipitation of hydrophobic polymer colloids that are subsequently captured in a collection reservoir of pure water. The FNP system is robust and can operate at room temperature, and can be scaled-up.

A schematic of structured nanocolloid formation by FNP is shown in FIG. 1 at right. Nanocolloids form upon rapid precipitation of polymers into condensed phases. When a solution of two polymers is fed into the FNP process, the final equilibrium structure is determined by the self-organization of the polymers to minimize the total interfacial energy between the ternary phases, i.e., the polymer-polymer-liquid phases.[27] The Janus morphology emerges if the two polymers possess similar interfacial energies with the solvent/water solution ($\gamma_{polymer1-water} \sim \gamma_{polymer2-water}$) and a lower interfacial energy between themselves ($\gamma_{polymer1-polymer2} < \gamma_{polymer1-water}$ and $\gamma_{polymer2-water}$) as shown in FIG. 1 for the Janus colloid. However, if one polymer favors the solvent/water solution over the other, then a core-shell morphology emerges as the equilibrium structure (shown in FIG. 1 for the core-shell colloid). In addition to thermodynamic forces, kinetics also drive nanocolloid morphology, because the nanocolloid structures can be kinetically arrested in non-equilibrium states as one or more of the polymers vitrifies during phase separation.[21] Hence, FNP produces structured colloids via the phase separation of polymer mixtures within a confined volume.

Experimental Examples

Polystyrene (PS) (Mw=13.2 kg/mol, PDI=1.06) was purchased from Fluka Analytical. Amine-terminated polystyrene (PS-NH$_2$) (Mn=10 kg/mol, PDI≤1.3) was purchased from Aldrich. Poly(1,4-isoprene) (PI) (Mw=11.6 kg/mol, PDI=1.06) was purchased from Polymer Source Inc. Tetrahydrofuran (THF) was purchased from Fisher-Scientific. Deionized (DI) water was filtered through a 0.2 μm filter using a NANOpure Diamond filtration system. Tween 80 (polyoxyethylene (80)) was purchased from Fisher Scientific.

Citrate-stabilized Au nanocatalyst was prepared according to the method presented by Turkevich and Frens.[35,36] Gold(III) chloride trihydrate purchased from Sigma-Aldrich was dissolved in DI water and brought to a vigorous boil while stirring. Sodium citrate tribasic dihydrate, also purchased from Sigma-Aldrich, was dissolved in DI water and quickly added to the flask. The mixture was kept boiling and stirring until a deep red color was achieved, and the suspension was cooled to room temperature overnight. The gold (Au) nanocatalyst formed was approximately 10 nm in diameter, as confirmed by dynamic light scattering and transmission electron microscopy (TEM).

Nanocolloid Assembly

Homopolymers were dissolved in THF at 0.5 mg/mL and were mixed at a range of desired volumetric ratios. FNP was performed using a confined impingement jet (CIJ) system where the polymer solution was injected against an equal volume of the anti-solvent stream, which was composed of DI water, an aqueous suspension of prepared citrate-stabilized Au nanocatalyst, or a 1% v/v aqueous solution of Tween 80. The effluent stream emptied into a reservoir of either DI water or 1% v/v Tween 80 with the volume ratio of polymer solution to anti-solvent to reservoir being 1:1:1.

Sample Preparation and Imaging

The nanocolloids were aged for one hour after FNP before staining. When staining, 500 μL of the polymer nanocolloids with gold were mixed with 500 μL 0.2 wt % OsO$_4$ (Electron Microscopy Sciences) in a centrifuge tube and incubated for 2 hours before centrifuging and washing with DI water 3 times. To prepare samples for electron microscopy, 7 μL of the stained nanocolloid suspension was deposited on a carbon-coated copper TEM grid (CF-200-Cu, Electron Microscopy Sciences) and 80 μL of the stained nanocolloid suspension was deposited on carbon tape mounted on an aluminum scanning electron microscope (SEM) stand (Electron Microscopy Sciences). Samples were left to dry overnight at ambient conditions. Imaging was performed on a CM100 TEM with an accelerating voltage of 100 kV and on an FEI Quanta 200 FEG Environmental SEM with an accelerating voltage of 10 kV.

Variation of Parameters and Formation of Different Morphologies

In order to explore the suitability of FNP for the production of structured hybrid nanocolloids, polymer nanocolloid architectures of interest were generated in the absence of inorganic nanoparticles. Both Janus and core-shell nanocolloids by FNP were formed, as illustrated in FIG. 2. Polystyrene (PS) and polyisoprene (PI) were used as model polymers for this investigation. A variety of polymers can be transformed into structured nanocolloids using FNP.[21] When an equal-mass PS:PI mixture (blend) at an overall concentration of 0.5 mg/mL in THF is injected at approximately 5 m/s against an aqueous stream, symmetric Janus nanocolloids with a mean diameter of ~400 nm are formed, as illustrated in the upper-left box of FIG. 2. The anisotropy of the Janus nanocolloids can be controlled by changing the ratio of the two polymers in the feed stream. When a 2:1 PS:PI mixture is used, Janus nanocolloids with larger PS domains are formed (upper-middle box of FIG. 2). Conversely, when a 1:2 PS:PI mixture is fed, Janus nanocolloids with larger PI domains are formed (upper-right box of FIG. 2). Thus, FNP can be used to tune Janus anisotropy.

In order to direct the assembly of a metal catalyst, i.e., a gold (Au) nanocatalyst, atop only one domain of a Janus nanocolloid, one of the domains was selectively functionalized using a polymer end-group functionalized with the appropriate moiety.[9] Here, amine-terminated PS (PS-NH$_2$) was used, which electrostatically interacts with citrate groups stabilizing the Au nanocatalyst. FNP was performed using a blend of PS-NH$_2$ and PI in the feed stream.

The lower-left box of FIG. 2 shows that the nanocolloids formed using an equal-mass mixture of PS-NH$_2$ and PI in the feed stream have a core-shell morphology in which a PI core is encapsulated by a PS-NH$_2$ shell. The presence of the amine group increases the hydrophilicity of the PS-NH$_2$ chain to the point at which it becomes energetically favorable for it to form a shell around the more hydrophobic PI core. Analysis of TEM images of the nanocolloids confirms that 50% of the nanocolloid is composed of each polymer. The thickness of the shell layer can be tuned by adjusting the ratio of PS-NH$_2$ to PI in the feed stream, as demonstrated in the lower-middle and lower-right boxes of FIG. 2.

Metal Catalyst at Circumferential Contact Line

Au nanocatalyst was incorporated into the nanocolloids in a controlled fashion. Au nanocatalyst is dispersed in the aqueous anti-solvent stream prior to performing FNP. Operationally, the FNP system is unchanged, only the composition of the anti-solvent stream is modified. With a 1:2 PS:PI mixture in the polymer solution stream, Janus nanocolloids are formed with approximately the same composition and Au nanocatalyst is aligned at the PS:PI:water contact line, as shown in the upper-left box of FIG. 3. That is, this structure was achieved in a one-step process. Insights from investigations on the addition of surfactant nanoparticles into block copolymer systems to control morphology provides a framework to rationalize the results for the case of polymer blends.[28-30] Nanoparticle location within diblock copolymer films and nanocolloids is determined by the interactions between the nanoparticles and each block of the copolymer.[28-30] Nanoparticles were selectively deposited within one block by functionalizing its surface with moieties that preferentially interact with one block over the other. However, when the nanoparticle surface was "neutral" with respect to the two blocks, they assembled at the interface between the phase-separated microdomains.[28] In the PS/PI system presented here, the citrate-stabilized Au nanocatalyst surface is hydrophilic and neutral with respect to the two homopolymers, and thus localizes to the contact line between the two polymers and the aqueous environment, schematically illustrated in the upper-right box of FIG. 3. In this manner, the Au nanocatalyst can be viewed as nanoparticle surfactants that reduce the interfacial energy between the PS and PI domains. Thus, Janus particles with a metal ring can be formed.

Metal Catalyst on PS-NH$_2$ Domain

The morphology of nanocolloids comprised of PS-NH$_2$ and PI formed in the presence of Au nanocatalyst was investigated. Janus nanocolloids are formed in which the Au nanocatalyst is selectively located on the PS-NH$_2$ domain, as illustrated in the lower-left box of FIG. 3. Interfacial energy arguments guide our interpretation of this phenomena. Without Au nanocatalyst in the system, the ionized (in water) amine end groups of the PS-NH$_2$ chains drive the formation of core-shell nanocolloids with the PS-NH$_2$ as the outer shell. However, upon addition of Au nanocatalyst, which are no longer neutral with respect to both polymers due to attractive electrostatic interactions between the amine groups on the polymer chains and citrate groups on the Au nanocatalyst, the Au nanocatalyst are engulfed in the PS-NH$_2$ phase (lower-right box of FIG. 3). This is analogous to the use of amine surfactants to transfer negatively-charged Au colloids from an aqueous phase into an organic solvent phase.[31] Once the amine groups of PS-NH$_2$ have surrounded the Au nanocatalyst, the remainder of the PS-NH$_2$ chain, which displays characteristics of pure PS, is oriented outwards towards the solvent mixture. The polymer-polymer interactions are then effectively those between PS and PI, and the nanocolloid assumes a Janus morphology. The anisotropy of the nanocolloids is still controlled by the feed ratio of the two polymers. This demonstrates that the FNP platform is capable of producing hybrid polymer-inorganic Janus nanocolloids by simply adjusting the formulation of the feed streams without any change to the process.

The above describes results obtained by incorporating the Au nanocatalyst into the aqueous anti-solvent stream of the FNP system. However, similar results were obtained when the Au nanocatalyst was added to the collection reservoir instead. At the point when the effluent reaches the reservoir, the mixing of the streams is complete and the nanocolloids have adopted the morphology which minimizes their interfacial energies. However, because a 1:1:1 volume ratio of polymer solution:anti-solvent:reservoir is typically used, a significant fraction of solvent remains in the collection vessel. The polymers in the system retain some mobility due to this residual solvent and can transition from one stable state to another upon the addition of new components. For example, PS-NH$_2$/PI core-shell nanocolloids transition to a Janus morphology when Au nanocatalyst is added to the reservoir. The ability to incorporate the Au nanocatalyst into the anti-solvent stream demonstrates the scalable nature of the FNP process, and the ability to add components, such as the Au nanocatalyst, at another point in the system demonstrates the flexibility of FNP.

"Snowman" Structure

During the FNP process, nanocolloid morphology is determined by the minimization of the total interfacial energy, and additives such as surfactants or low molecular weight block copolymers have been studied in polymer blend and block copolymer colloid systems as agents which affect particle morphology by changing the energetic interactions in the system.[32-34] In order to further manipulate the interactions in the FNP system, a surfactant molecule was added into the FNP process. Tween 80, a non-ionic surfactant that does not contribute electrostatic effects, was used. With Tween 80 present in the system, either as added into the anti-solvent stream or as added into the reservoir, the nanocolloids adopted a "snowman" Janus morphology, whether they are prepared with PS/PI (left box of FIG. 4) or PS-NH$_2$/PI (right box of FIG. 4). Without being bound by theory, the amphiphilic Tween 80 may interact with the hydrophobic polymer chains and the aqueous environment to reduce the interfacial energy penalty of the polymer-solvent interface, leading to an increase in surface area between the polymer and surrounding solvent and a reduction of the polymer-polymer contact area. The result is a "snowman" Janus structure with two lobes, where the relative sizes of the two lobes depend on the relative volumes of the two polymers in the feed stream.

Asymmetric Hybrid Polymer-Inorganic Nanocolloids

As discussed above, the addition of Tween 80 surfactant leads to the formation of "snowman" Janus nanocolloids for mixtures of both PS/PI and PS-NH$_2$/PI. The addition of Tween 80 surfactant also influences where the Au nanocatalyst particles are located on the nanocolloid formed. For nanocolloids prepared from a PS-NH$_2$/PI blend in the feed stream, the Au nanocatalyst particles remain distributed on the PS-NH$_2$ domain, because of the electrostatic attractions between the citrate groups on the Au nanocatalyst surface and the amine groups on the PS-NH$_2$ chains, as shown in the left box of FIG. 5. These interactions are not affected by the addition of Tween 80 surfactant, despite the change in the overall morphology of the nanocolloid. However, nanocolloids made from a PS/PI blend, which would otherwise display the Au nanocatalyst particles at the PS/PI interface, display the Au nanocatalyst on the PI domain when Tween 80 surfactant is added (right box of FIG. 5). The amphiphilic nature of the Tween 80 surfactant encourages interaction between the hydrophobic PI domain and the hydrophilic Au nanocatalyst, eliminating confinement of the Au nanocatalyst to the PS:PI:water contact line. Therefore, the addition of a surfactant can not only contribute to changes in nanocolloid morphology, but can also direct the placement of nanocatalyst materials on the nanocolloid.

FNP is a flexible, continuous, and scalable (up to industrial scales) process, with short characteristic processing times, and is a platform for the production of hybrid polymer-inorganic nanocolloids with a range of morphologies and functionalities. Control over nanocolloid morphology can be achieved by tailoring interactions between the polymers and the solvents, for example, by incorporating functional groups into one of the polymers or by adding a surfactant to the system. Beyond changing the morphology of the nanocolloids, these factors can also be used to direct the location of added nanocatalytic particles on the nanocolloids, thus allowing for functionality to be tailored, and enabling the facile formation of nanocolloids, which is useful in biphasic catalytic applications at industrial scales.

FNP can be used to manufacture hybrid polymer-inorganic nanocolloids (e.g., polymer-metal Janus nanoparticles) in which one phase is selectively decorated with a metal nanocatalyst by tuning the molecular interactions between the feed ingredients during the process. For example, by modifying the polymer end-group functionality, the location of a metal nanocatalyst on the nanocolloid can be tuned. The point in the FNP process where metal is added (e.g., in the form of gold nanoparticles) can influence the distribution of metal on the colloid. The addition of molecular additives, such as surfactants, can transform the Janus nanocolloid structure from spherical to dumbbell or "snowman", while still maintaining the ability to control the location of the nanocatalyst.

The polymer-metal Janus particles and metal-ringed polymer Janus particles described herein can be used in medical imaging, for stabilizer-phase selective catalysis. The nanocolloids described herein can be used for the formation of metal shells and rings.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

REFERENCES

1. Binks, B. P. & Fletcher, P. D. I. Particles Adsorbed at the Oil-Water Interface: A Theoretical Comparison between Spheres of Uniform Wettability and "Janus" Particles. Langmuir: the ACS journal of surfaces and colloids 17, 4708-4710 (2001).
2. Chen, Q., Bae, S. C. & Granick, S. Directed self-assembly of a colloidal kagome lattice. Nature 469, 381-384, doi:10.1038/nature09713 (2011).
3. Walther, A., Andre, X., Drechsler, M., Abetz, V. & Muller, A. H. Janus Discs. Journal of the American Chemical Society 129, 6187-6198 (2007).
4. Park, B. J., Brugarolas, T. & Lee, D. Janus particles at an oil-water interface. Soft Matter 7, 6413 (2011).
5. Jiang, S. et al. Janus particle synthesis and assembly. Adv Mater 22, 1060-1071, doi:10.1002/adma.200904094 (2010).
6. Gao, W., Pei, A., Feng, X., Hennessy, C. & Wang, J. Organized self-assembly of Janus micromotors with hydrophobic hemispheres. Journal of the American Chemical Society 135, 998-1001, doi:10.1021/ja311455k (2013).
7. Rahmani, S. & Lahann, J. Recent progress with multi-compartmental nanoparticles. MRS Bulletin 39, 251-257, doi:10.1557/mrs.2014.10 (2014).
8. Groschel, A. H. et al. Guided hierarchical co-assembly of soft patchy nanoparticles. Nature 503, 247-251 (2013).
9. Kanahara, M. et al. Fabrication of NIR-Excitable SERS-Active Composite Particles Composed of Densely Packed Au Nanoparticles on Polymer Microparticles. Particle & Particle Systems Characterization 32, 441-447 (2015).
10. Takei, H. & Shimizu, N. Gradient Sensitive Microscopic Probes Prepared by Gold Evaporation and Chemisorption on Latex Spheres. Langmuir: the ACS journal of surfaces and colloids 13, 1865-1868 (1997).
11. Anker, J. N. & Kopelman, R. Magnetically modulated optical nanoprobes. Applied Physics Letters 82, 1102, doi:10.1063/1.1544435 (2003).
12. Ma, X., Hahn, K. & Sanchez, S. Catalytic mesoporous Janus nanomotors for active cargo delivery. Journal of the American Chemical Society 137, 4976-4979, doi:10.1021/jacs.5b02700 (2015).
13. Pera-Titus, M., Leclercq, L., Clacens, J. M., De Campo, F. & Nardello-Rataj, V. Pickering interfacial catalysis for biphasic systems: from emulsion design to green reactions. Angewandte Chemie 54, 2006-2021 (2015).
14. Crossley, S., Faria, J., Shen, M. & Resasco, D. E. Solid Nanoparticles that Catalyze Biofuel Upgrade Reactions at the Water/Oil Interface. Science 327, 68-72 (2010).
15. Faria, J., Ruiz, M. P. & Resasco, D. E. Phase-Selective Catalysis in Emulsions Stabilized by Janus Silica-Nanoparticles. Advanced Synthesis & Catalysis 352, 2359-2364 (2010).
16. Kirillova, A. et al. Hybrid Hairy Janus Particles Decorated with Metallic Nanoparticles for Catalytic Applications. ACS applied materials & interfaces 7, 21218-21225 (2015).
17. Suzuki, D. & Kawaguchi, H. Janus particles with a functional gold surface for control of surface plasmon resonance. Colloid and Polymer Science 284, 1471-1476 (2006).
18. Yoon, K., Lee, D., Kim, J. W., Kim, J. & Weitz, D. A. Asymmetric functionalization of colloidal dimer particles with gold nanoparticles. Chem Commun (Camb) 48, 9056-9058 (2012).
19. Tu, F. & Lee, D. Shape-changing and amphiphilicity-reversing Janus particles with pH-responsive surfactant properties. Journal of the American Chemical Society 136, 9999-10006 (2014).

20. Arita, T. et al. Localization of polymer-grafted maghemite nanoparticles in a hemisphere of Janus polymer particles prepared by a self-organized precipitation (SORP) method. J. Mater. Chem. C 1, 207-212 (2013).
21. Sosa, C. et al. Soft Multi-Faced and Patchy Colloids by Constrained Volume Self-Assembly. Macromolecules 49, 3580-3585 (2016).
22. Johnson, B. K. & Prud'homme, R. K. Chemical Processing and Micromixing in Confined Impinging Jets. AIChE Journal 49, 2264-2282 (2003).
23. Saad, W. S. & Prud'homme, R. K. Principles of nanoparticle formation by flash nanoprecipitation. Nano Today 11, 212-227, doi:10.1016/j.nantod.2016.04.006 (2016).
24. Zhang, C., Pansare, V. J., Prud'homme, R. K. & Priestley, R. D. Flash nanoprecipitation of polystyrenenanoparticles. Soft Matter 8, 86-93 (2012).
25. Johnson, B. K. & Prud'homme, R. K. Flash NanoPrecipitation of Organic Actives and Block Copolymers using a Confined Impinging Jets Mixer. Australian Journal of Chemistry 56, 1021-1024 (2003).
26. Han, J. et al. A simple confined impingement jets mixer for flash nanoprecipitation. Journal of pharmaceutical sciences 101, 4018-4023 (2012).
27. Roh, K. H., Martin, D. C. & Lahann, J. Biphasic Janus particles with nanoscale anisotropy. Nature materials 4, 759-763, doi:10.1038/nmat1486 (2005).
28. Kim, B. J., Fredrickson, G. H., Hawker, C. J. & Kramer, E. J. Nanoparticle Surfactants as a Route to Bicontinuous Block Copolymer Morphologies. Langmuir: the ACS journal of surfaces and colloids 23, 7804-7809 (2007).
29. Jang, S. G. et al. Synthesis of thermally stable Au-core/Pt-shell nanoparticles and their segregation behavior in diblock copolymer mixtures. Soft Matter 7, 6255, doi:10.1039/c1sm05223c (2011).
30. Jang, S. G. et al. Striped, ellipsoidal particles by controlled assembly of diblock copolymers. Journal of the American Chemical Society 135, 6649-6657, doi:10.1021/ja4019447 (2013).
31. Mayya, K. S. & Caruso, F. Phase Transfer of Surface-Modified Gold Nanoparticles by Hydrophobization with Alkylamines. Langmuir: the ACS journal of surfaces and colloids 19, 6987-6993 (2003).
32. Jeon, S.-J., Yi, G.-R. & Yang, S.-M. Cooperative Assembly of Block Copolymers with Deformable Interfaces: Toward Nanostructured Particles. Advanced Materials 20, 4103-4108, doi:10.1002/adma.200801377 (2008).
33. Yang, H. et al. Engineering the Shape of Block Copolymer Particles by Surface-Modulated Graphene Quantum Dots. Chemistry of Materials 28, 830-837, doi:10.1021/acs.chemmater.5b04222 (2016).
34. Higuchi, T., Tajima, A., Yabu, H. & Shimomura, M. Spontaneous formation of polymer nanoparticles with inner micro-phase separation structures. Soft Matter 4, 1302, doi:10.1039/b800904j (2008).
35. Turkevich, J., Stevenson, P. C. & Hillier, J. A Study of the Nucleation and Growth Processes in the Synthesis of Colloidal Gold. Discuss. Faraday Soc. 11, 55-75 (1951).
36. Frens, G. Controlled Nucleation for the Regulation for the Particle Size in Monodisperse Gold Suspensions. Nature Physical Science 241, 20-22 (1973).

The invention claimed is:
1. A Janus nanocolloid comprising:
a first polymer without end-group functionalization;
a second polymer without end-group functionalization different from the first polymer;
a first region, comprising the first polymer at a greater weight fraction than the second polymer, having a first surface;
a second region, comprising the second polymer at a greater weight fraction than the first polymer, having a second surface, wherein the first region is in contact with the second region, and the first surface is in contact with the second surface, such that a contact line is formed where the first surface contacts the second surface; and
a metal nanocatalyst adhered on a surface formed by the first surface and the second surface and adhered on less than an entirety of the surface formed by the first surface and the second surface.

2. The Janus nanocolloid of claim 1, wherein the metal nanocatalyst is adhered on the contact line.

3. The Janus nanocolloid of claim 1, wherein the metal nanocatalyst is adhered on the first surface.

4. The Janus nanocolloid of claim 1, wherein a volume of the first region is greater than a volume of the second region.

5. The Janus nanocolloid of claim 1, wherein a volume of the first region is substantially the same as a volume of the second region.

6. The Janus nanocolloid of claim 1, wherein the first polymer and the second polymer are independently selected from a group consisting of polystyrene (PS), polyisoprene (PI), polybutadiene (PB), poly(lactic acid) (PLA), poly(vinylpyridine) (PVP), polyvinylcyclohexane (PVCH), poly(methylmethacrylate) (PMMA), polycaprolactone (PCL), polyamide, polysulfone, epoxy, epoxyresin, silicon rubber, silicon polymer, polyimide, and blends.

7. The Janus nanocolloid of claim 1,
wherein the first polymer is polystyrene (PS) and
wherein the second polymer is polyisoprene (PI).

8. The Janus nanocolloid of claim 1, wherein the metal nanocatalyst is a chelated metal nanocatalyst.

9. The Janus nanocolloid of claim 1, wherein the metal nanocatalyst is a citrate-stabilized metal nanocatalyst with the metal selected from the group consisting of gold, silver, copper, nickel, palladium, platinum, iron, cobalt, and zinc.

10. The Janus nanocolloid of claim 1, wherein the metal nanocatalyst is a citrate-stabilized gold nanocatalyst.

11. The Janus nanocolloid of claim 1, further comprising a surfactant.

12. The Janus nanocolloid of claim 1, further comprising a non-ionic surfactant.

13. The Janus nanocolloid of claim 12, wherein the non-ionic surfactant is selected from the group consisting of polyethylene glycol (PEG), polyethylene glycol alkyl ether, polypropylene glycol alkyl ether, glucoside alkyl ether, polyethylene glycol octylphenyl ether, polyethylene glycol alkylphenyl ether, glycerol alkyl ester, polyoxyethylene glycol sorbitan alkyl ester, sorbitan alkyl ester, cocamide MEA, dodecydimethylamine oxide, a block copolymer of polyethylene glycol and polypropylene glycol, polyethoxylate tallow amine, and combinations.

14. The Janus nanocolloid of claim 1, further comprising polyethylene glycol (PEG).

15. A method of forming a metal-polymer hybrid Janus nanocolloid, comprising:
dissolving a first polymer without end-group functionalization at a first concentration and a second polymer without end-group functionalization different from the first polymer at a second concentration in a solvent to form a polymer solution, selecting a nonsolvent, dissolving a metal salt and a chelating agent in the nonsolvent to form a nonsolvent solution, and continuously mixing the polymer solution with the nonsolvent solution to flash precipitate the metal-polymer hybrid Janus nanocolloid, wherein the metal-polymer hybrid Janus nanocolloid comprises the first polymer, the second polymer, a first region, comprising the first polymer at a greater weight fraction than the second polymer, having a first surface, a second region, comprising the second polymer at a greater weight fraction than the first polymer, having a second surface, and a metal nanocatalyst adhered on a surface formed by the first surface and the second surface and adhered on less than an entirety of the surface formed by the first surface and the second surface, wherein the first region is in contact with the second region, and the first surface is in contact with the second surface, such that a contact line is formed where the first surface contacts the second surface.

16. The method of claim 15, further comprising dissolving a non-ionic surfactant in the solvent.

17. The method of claim 15, further comprising dissolving a non-ionic surfactant in the nonsolvent.

18. The method of claim 17, wherein a ratio of the first concentration of the first polymer without end-group functionalization to the second concentration of the second polymer without end-group functionalization in the solvent is greater than or equal to 2:1, wherein a volume of the first region is greater than a volume of the second region, and wherein the metal nanocatalyst is adhered on the first surface.

19. The method of claim 17, wherein a ratio of the first concentration of the first polymer without end-group functionalization to the second concentration of the second polymer without end-group functionalization in the solvent is greater than or equal to 2:1, wherein a volume of the first region is greater than a volume of the second region, and wherein the metal nanocatalyst is adhered on the second surface.

20. The method of claim 15, wherein the nonsolvent does not comprise a surfactant and wherein the metal nanocatalyst is adhered on the contact line.

* * * * *